(12) United States Patent
Lan et al.

(10) Patent No.: US 6,596,803 B2
(45) Date of Patent: Jul. 22, 2003

(54) LAYERED CLAY INTERCALATES AND EXFOLIATES HAVING A LOW QUARTZ CONTENT

(75) Inventors: Tie Lan, Lake Zurich, IL (US); Vasiliki Psihogios, Palatine, IL (US); Shriram Bagrodia, Kingsport, TN (US); Louis Thomas Germinario, Kingsport, TN (US); John Walker Gilmer, Kingsport, TN (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/896,961

(22) Filed: Jun. 29, 2001

(65) Prior Publication Data

US 2002/0028870 A1 Mar. 7, 2002

Related U.S. Application Data

(63) Continuation of application No. 09/583,120, filed on May 30, 2000.

(51) Int. Cl.⁷ .................................................. C08K 3/34
(52) U.S. Cl. ...................................... 524/445; 524/447
(58) Field of Search ................................ 524/444, 445, 524/447; 428/403, 404, 407; 501/145, 146, 148, 149

(56) References Cited

U.S. PATENT DOCUMENTS

| | | |
|---|---|---|
| 2,035,546 A | 3/1936 | Hamilton ..................... 167/24 |
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,419,460 A | 12/1968 | Ure ........................... 161/162 |
| 3,419,517 A | 12/1968 | Hedrick et al. ............... 260/37 |
| 3,499,916 A | 3/1970 | Berthold |
| 3,514,498 A | 5/1970 | Okazaki et al. |
| 3,515,626 A | 6/1970 | Duffield ..................... 161/162 |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,773,708 A | 11/1973 | Takahashi et al. ........ 260/41 R |
| 3,792,969 A | 2/1974 | Gertisser |
| 3,795,650 A | 3/1974 | Burns .................... 260/33.4 R |
| 3,823,169 A | 7/1974 | Staub |
| 3,843,479 A | 10/1974 | Matsunami et al. ........ 161/165 |
| 3,849,406 A | 11/1974 | Basel et al. |
| 3,876,552 A | 4/1975 | Moynihan |
| 3,879,283 A | 4/1975 | Mercade ........................ 209/5 |
| 3,912,532 A | 10/1975 | Simone .................. 106/308 N |
| 3,929,678 A | 12/1975 | Laughlin et al. ............. 252/526 |
| 3,929,849 A | 12/1975 | Oswald ....................... 260/448 |
| 3,946,089 A | 3/1976 | Furukawa et al. ..... 260/857 PG |
| 4,018,746 A | 4/1977 | Brinkmann et al. |

(List continued on next page.)

FOREIGN PATENT DOCUMENTS

| | | |
|---|---|---|
| DE | 1 642 122 | 7/1970 |
| DE | 3806548 | 9/1988 |
| DE | 3808623 | 10/1988 |
| DE | 281 585 A5 | 8/1990 |
| EP | 186456 | 7/1986 |
| EP | 0202532 | 11/1986 |
| EP | 0 205 281 A3 | 12/1986 |
| EP | 261430 | 3/1988 |
| EP | 278403 | 8/1988 |
| EP | 295336 | 12/1988 |
| EP | 0 335 653 A1 | 10/1989 |
| EP | 0 358 415 A1 | 3/1990 |
| EP | 398551 | 11/1990 |
| EP | 459472 | 12/1991 |

(List continued on next page.)

OTHER PUBLICATIONS

Francis, C. W., "Adsorption of Polyvinylpyrrolidone on Reference Clay Minerals", *Soil Science*, vol. 115, No. 1, 1973, pp. 40–54.

Usuki, A., et al., "Synthesis of nylon 6–clay hybrid", *J. Mater. Res.*, vol. 8, No. 5, May 1993, pp. 1179–1184.

Kojima, Y., et al., "Mechanical Properties Of Nylon 6–Clay Hybrid", *J. Mater. Res.*, vol. 8, No. 5, May 1993, pp. 1185–1189.

Suzuki, K., et al., "Preparation Of Delaminated Clay Having A Narrow Micropore Distribution In The Presence Of Hydroxyaluminum Cations And Polyvinyl Alcohol", *Clays and Clay Minerals*, vol. 36, No. 2, 1988, pp. 147–152.

Levy, R., et al., "Interlayer Adsorption of Polyvinylpyrrolidone On Montmorillonite", *Journal of Colloid and Interface Science*, vol. 50, No. 3, Mar. 1975, pp. 442–450.

Greenland, D.J., "Adsorption Of Polyvinyl Alcohols By Montmorillonite", *Journal of Colloid Science*, (1963), 18, pp. 647–664.

(List continued on next page.)

Primary Examiner—Edward J. Cain
Assistant Examiner—Katarzyna W. Lee
(74) *Attorney, Agent, or Firm*—Marshall, Gerstein & Borun

(57) ABSTRACT

The invention is directed to a polymer-clay nanocomposite material comprising a melt-processible matrix polymer and a layered clay material having low quartz content. This invention is also directed to a process for preparing a polymer-clay nanocomposites, and articles or products produced from nanocomposite materials.

18 Claims, 7 Drawing Sheets

U.S. PATENT DOCUMENTS

| | | | |
|---|---|---|---|
| 4,053,493 A | 10/1977 | Oswald | 260/448 |
| 4,064,112 A | 12/1977 | Rothe et al. | |
| 4,071,503 A | 1/1978 | Thomas et al. | |
| 4,081,496 A | 3/1978 | Finlayson | |
| 4,105,578 A | 8/1978 | Finlayson et al. | |
| 4,116,866 A | 9/1978 | Finlayson | |
| 4,125,411 A | 11/1978 | Lyons | 106/291 |
| 4,133,802 A | 1/1979 | Hachiboshi et al. | 528/502 |
| 4,136,103 A | 1/1979 | Oswald | 260/448 |
| 4,161,578 A | 7/1979 | Herron | |
| 4,163,002 A | 7/1979 | Pohl et al. | |
| 4,208,218 A | 6/1980 | Finlayson | |
| 4,210,572 A | 7/1980 | Herman et al. | 260/404 |
| 4,219,527 A | 8/1980 | Edelman et al. | |
| 4,239,826 A | 12/1980 | Knott, II et al. | |
| 4,251,576 A | 2/1981 | Osborn et al. | 428/331 |
| 4,391,637 A | 7/1983 | Mardis et al. | |
| 4,393,007 A | 7/1983 | Priester et al. | |
| 4,398,642 A | 8/1983 | Okudaria et al. | |
| 4,400,485 A | 8/1983 | Mukamal et al. | 524/444 |
| 4,410,364 A | 10/1983 | Finlayson et al. | |
| 4,412,018 A | 10/1983 | Finlayson et al. | |
| 4,429,079 A | 1/1984 | Shibata et al. | |
| 4,431,775 A | 2/1984 | Maeda et al. | 523/203 |
| 4,434,075 A | 2/1984 | Mardis et al. | 252/315.2 |
| 4,434,076 A | 2/1984 | Mardis et al. | |
| 4,442,163 A | 4/1984 | Kühner et al. | |
| 4,450,095 A | 5/1984 | Finlayson | |
| 4,472,538 A | 9/1984 | Kamigaito et al. | 523/202 |
| 4,482,695 A | 11/1984 | Barbee et al. | |
| 4,500,670 A | 2/1985 | McKinley et al. | 524/445 |
| 4,517,112 A | 5/1985 | Mardis et al. | |
| 4,536,425 A | 8/1985 | Hekal | |
| 4,546,126 A | 10/1985 | Breitenfellner et al. | 523/216 |
| 4,546,145 A | 10/1985 | Kishida et al. | 524/780 |
| 4,595,715 A | 6/1986 | Kuze et al. | |
| 4,600,409 A | 7/1986 | Campbell | |
| 4,600,744 A | 7/1986 | Libor et al. | 524/446 |
| 4,613,542 A | 9/1986 | Alexander | 428/290 |
| 4,624,982 A | 11/1986 | Alexander | 524/446 |
| 4,646,925 A | 3/1987 | Nohara | |
| 4,676,929 A | 6/1987 | Rittler | 252/315.2 |
| 4,677,158 A | 6/1987 | Tso et al. | |
| 4,680,208 A | 7/1987 | Aoki et al. | |
| 4,720,420 A | 1/1988 | Crass et al. | |
| 4,725,466 A | 2/1988 | Crass et al. | |
| 4,739,007 A | 4/1988 | Okada et al. | 524/789 |
| 4,742,098 A | 5/1988 | Finlayson et al. | |
| 4,769,078 A | 9/1988 | Tso | |
| 4,777,206 A | 10/1988 | Rittler | 524/445 |
| 4,789,403 A | 12/1988 | Rice | 106/417 |
| 4,798,766 A | 1/1989 | Rice | 428/404 |
| 4,810,734 A | 3/1989 | Kawasumi et al. | 523/216 |
| 4,842,651 A | 6/1989 | Ravet et al. | 106/487 |
| 4,849,006 A | 7/1989 | Knudson, Jr. | 71/64.11 |
| 4,851,021 A | 7/1989 | Bohrn et al. | 65/17 |
| 4,875,762 A | 10/1989 | Kato et al. | 350/357 |
| 4,889,885 A | 12/1989 | Usuki et al. | 524/443 |
| 4,894,411 A | 1/1990 | Okada et al. | 524/710 |
| 4,920,171 A | 4/1990 | Hutton, Jr. et al. | 524/446 |
| 4,946,365 A | 8/1990 | Kudert et al. | |
| 4,956,121 A | 9/1990 | Tymon et al. | 252/378 R |
| 4,957,980 A | 9/1990 | Kobayashi et al. | |
| 4,983,432 A | 1/1991 | Bissot | |
| 4,983,719 A | 1/1991 | Fox et al. | |
| 4,994,313 A | 2/1991 | Shimizu et al. | |
| 5,028,351 A | 7/1991 | Kato et al. | 252/315.2 |
| 5,028,462 A | 7/1991 | Matlack et al. | |
| 5,032,546 A | 7/1991 | Giannelis et al. | 501/3 |
| 5,032,547 A | 7/1991 | Giannelis et al. | 501/3 |
| 5,034,252 A | 7/1991 | Nilsson et al. | |
| 5,037,285 A | 8/1991 | Kudert et al. | |
| 5,091,462 A | 2/1992 | Fukui et al. | 524/504 |
| 5,102,948 A | 4/1992 | Deguchi et al. | 524/789 |
| 5,110,501 A | 5/1992 | Knudson, Jr. et al. | |
| 5,149,485 A | 9/1992 | Belcher | |
| 5,153,061 A | 10/1992 | Cavagna et al. | |
| 5,153,062 A | 10/1992 | Grolig et al. | |
| 5,164,440 A | 11/1992 | Deguchi et al. | 524/444 |
| 5,164,460 A | 11/1992 | Yano et al. | 624/445 |
| 5,204,078 A | 4/1993 | Tateyama et al. | 423/331 |
| 5,206,284 A | 4/1993 | Fukui et al. | 524/504 |
| 5,221,507 A | 6/1993 | Beck et al. | |
| 5,229,451 A | 7/1993 | Carter et al. | 524/493 |
| 5,248,720 A | 9/1993 | Deguchi et al. | 524/444 |
| 5,273,706 A | 12/1993 | Laughner | |
| 5,314,987 A | 5/1994 | Kim et al. | |
| 5,326,500 A | 7/1994 | Friedman et al. | 252/378 |
| 5,334,241 A | 8/1994 | Jordan | |
| 5,336,647 A | 8/1994 | Naé et al. | |
| 5,340,558 A | 8/1994 | Friedman et al. | 423/328.1 |
| 5,340,884 A | 8/1994 | Mills et al. | |
| 5,374,306 A | 12/1994 | Schlegel et al. | |
| 5,382,650 A | 1/1995 | Kasowski et al. | |
| 5,385,776 A | 1/1995 | Maxfield et al. | 428/297 |
| 5,391,437 A | 2/1995 | Miyasaka et al. | 528/425.5 |
| 5,414,042 A | 5/1995 | Yasue et al. | 524/789 |
| 5,428,094 A | 6/1995 | Tokoh et al. | 524/379 |
| 5,429,999 A | 7/1995 | Naé et al. | |
| 5,434,000 A | 7/1995 | Konagaya et al. | |
| 5,506,046 A | 4/1996 | Andersen et al. | 524/446 |
| 5,508,072 A | 4/1996 | Andersen et al. | 524/446 |
| 5,514,734 A | 5/1996 | Maxfield et al. | 523/204 |
| 5,523,045 A | 6/1996 | Kudert et al. | |
| 5,530,052 A | 6/1996 | Takekoshi et al. | |
| 5,552,469 A * | 9/1996 | Beall et al. | 524/445 |
| 5,554,670 A | 9/1996 | Giannelis et al. | 523/209 |
| 5,578,672 A | 11/1996 | Beall et al. | 624/446 |
| 5,612,138 A | 3/1997 | Kurz et al. | |
| 5,620,774 A | 4/1997 | Etchu et al. | |
| 5,648,159 A | 7/1997 | Sato | |
| 5,659,034 A | 8/1997 | Debord et al. | 546/2 |
| 5,660,761 A | 8/1997 | Katsumoto et al. | |
| 5,665,454 A | 9/1997 | Hosoi et al. | |
| 5,667,886 A | 9/1997 | Gough et al. | 428/331 |
| 5,698,624 A | 12/1997 | Beall et al. | 524/445 |
| 5,721,306 A | 2/1998 | Tsipursky et al. | 524/449 |
| 5,728,764 A | 3/1998 | Bauer et al. | |
| 5,730,996 A | 3/1998 | Beall et al. | 424/405 |
| 5,747,403 A | 5/1998 | Boyd et al. | 502/62 |
| 5,747,560 A | 5/1998 | Christiani et al. | 523/209 |
| 5,760,106 A | 6/1998 | Pinnavaia et al. | 523/209 |
| 5,760,121 A | 6/1998 | Beall et al. | 524/450 |
| 5,766,751 A | 6/1998 | Kotani et al. | 428/323 |
| 5,780,376 A | 7/1998 | Gonzales et al. | |
| 5,801,216 A | 9/1998 | Pinnavaia et al. | 523/209 |
| 5,804,613 A | 9/1998 | Beall et al. | 523/200 |
| 5,807,630 A | 9/1998 | Christie et al. | |
| 5,830,528 A | 11/1998 | Beall et al. | 427/220 |
| 5,830,544 A | 11/1998 | Kerscher et al. | |
| 5,837,763 A | 11/1998 | Ferraro et al. | 524/449 |
| 5,844,032 A | 12/1998 | Serrano et al. | 524/445 |
| 5,849,830 A | 12/1998 | Tsipursky et al. | 524/450 |
| 5,853,886 A | 12/1998 | Pinnavaia et al. | 428/403 |
| 5,876,812 A | 3/1999 | Frisk et al. | |
| 5,877,248 A | 3/1999 | Beall et al. | 524/450 |
| 5,880,197 A | 3/1999 | Beall et al. | 524/445 |
| 5,882,751 A | 3/1999 | Occhiello et al. | |
| 5,910,523 A | 6/1999 | Hudson | 523/213 |
| 5,916,685 A | 6/1999 | Frisk et al. | |
| 5,942,320 A | 8/1999 | Miyake et al. | |

| | | | |
|---|---|---|---|
| 5,952,093 A | 9/1999 | Nichols et al. | |
| 5,952,095 A | 9/1999 | Beall et al. | 428/332 |
| 5,955,094 A | 9/1999 | Beall et al. | 424/405 |
| 5,972,448 A | 10/1999 | Frisk et al. | |
| 5,981,029 A | 11/1999 | Harada et al. | 428/143 |
| 5,993,769 A | 11/1999 | Pinnavaia et al. | |
| 5,994,445 A | 11/1999 | Kaschel et al. | 524/444 |
| 5,998,528 A | 12/1999 | Tsipursky et al. | 524/445 |
| 6,017,632 A * | 1/2000 | Pinnavaia et al. | 428/403 |
| 6,034,163 A | 3/2000 | Barbee et al. | 524/445 |
| 6,036,765 A | 3/2000 | Farrow et al. | |
| 6,050,509 A * | 4/2000 | Clarey et al. | 241/21 |
| 6,057,396 A | 5/2000 | Lan et al. | 524/445 |
| 6,060,549 A | 5/2000 | Li et al. | |
| 6,071,988 A | 6/2000 | Barbee et al. | 523/210 |
| 6,083,559 A | 7/2000 | Beall et al. | 427/220 |
| 6,084,019 A | 7/2000 | Matayabas, Jr. et al. | 524/445 |
| 6,090,734 A | 7/2000 | Tsipursky et al. | 501/141 |
| 6,117,541 A | 9/2000 | Frisk | |
| 6,120,860 A | 9/2000 | Bowen et al. | |
| 6,124,365 A | 9/2000 | Lan et al. | 516/101 |
| 6,126,734 A | 10/2000 | Beall et al. | 106/487 |
| 6,156,835 A | 12/2000 | Anderson et al. | |
| 6,162,857 A | 12/2000 | Trexler et al. | |
| 6,225,394 B1 | 5/2001 | Lan et al. | 524/445 |
| 6,228,903 B1 | 5/2001 | Beall et al. | 523/209 |
| 6,232,388 B1 | 5/2001 | Lan et al. | 524/445 |
| 6,235,533 B1 | 5/2001 | Tsipursky et al. | 436/72 |
| 6,242,500 B1 | 6/2001 | Lan et al. | 516/101 |
| 6,251,980 B1 | 6/2001 | Lan et al. | 524/445 |
| 6,254,803 B1 | 7/2001 | Matthews et al. | |
| 6,262,162 B1 | 7/2001 | Lan et al. | 524/445 |
| 6,287,634 B1 | 9/2001 | Beall et al. | 427/220 |

FOREIGN PATENT DOCUMENTS

| | | |
|---|---|---|
| EP | 0 479 031 A1 | 4/1992 |
| EP | 542266 | 5/1993 |
| EP | 0 619 182 A1 | 10/1994 |
| EP | 0 645 181 A3 | 3/1995 |
| EP | 650994 | 5/1995 |
| EP | 0691212 | 1/1996 |
| EP | 0691376 | 1/1996 |
| EP | 681990 | 11/1996 |
| EP | 0 747 451 A2 | 12/1996 |
| EP | 0 761 739 A1 | 3/1997 |
| EP | 0 780 340 A1 | 6/1997 |
| EP | 0 822 163 | 2/1998 |
| EP | 0 846 723 | 6/1998 |
| EP | 0 909 787 | 4/1999 |
| EP | 940430 | 9/1999 |
| GB | 1090036 | 11/1967 |
| GB | 1 146 668 | 3/1969 |
| GB | 1 565 362 | 4/1980 |
| GB | 2 088 932 A | 6/1982 |
| GB | 2 123 041 | 1/1984 |
| JP | 75001156 | 1/1975 |
| JP | 50029697 | 3/1975 |
| JP | 75005735 | 3/1975 |
| JP | 75005751 | 3/1975 |
| JP | 75010196 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 * | 3/1993 ............ C08K/9/04 |
| WO | WO 93/04125 | 3/1993 |
| WO | 0 548 940 A1 | 6/1993 |
| WO | WO 93/11190 | 6/1993 |
| WO | WO 93/14922 | 8/1993 |
| WO | 0 590 263 | 4/1994 |
| WO | WO 94/11430 * | 5/1994 ............ C08K/7/00 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/02323 | 1/1997 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/38914 | 8/1999 |
| WO | WO 99/41299 | 8/1999 |
| WO | WO 00/34377 | 6/2000 |
| WO | WO 00/34378 | 6/2000 |
| WO | WO 00/34393 | 6/2000 |

OTHER PUBLICATIONS

Vaia, R.A. , et al., "Synthesis an Properties of Two–Dimensional Nanostructures by Direct Intercalation of Polymer Melts in Layered Silicates", *Chem. Mater.* (1993), 5, pp. 1694–1696.

Vaia, R.A. , et al., "New Polymer Electrolyte Nanocomposites: Melt Intercalation of Poly(ethylene oxide) in Mica–Type Silicates", *Advanced Materials* (1995), 7, No. 2, pp. 154–156.

Akelah, A., et al., "Synthesis and Characterization of Epoxyphilic montmorillonites", *Clay Minerals,* (1994), 29, pp. 169–178.

Clapp, C.E., et al., "Adsorption Studies Of A Dextran On Montmorillonite", *Trans. 9th Int. Cong. Soil Sci.,* 1968, vol. 1, pp. 627–634.

Dekking, H.G.G., "Preparation And Properties Of Some Polymer–Clay Compounds", *Clays and Clay Minerals,* (1964), 12, pp. 603–616.

Usuki, A., et al., "Characterization and Properties of Nylon 6—Clay Hybrid", (source and date unknown), pp. 651–652.

Brindley, G.W., et al., "Preparation And Solvation Properties Of Some Variable Charge Montmorillonites", *Clays and Clay Minerals,* (1971), vol. 18, pp. 399–404.

Okada, A., et al., "A Solid State NMR Study On Crystalline Forms Of Nylon 6", *Journal of Applied Polymer Science,* (1989), vol. 37, pp. 1363–1371.

Usuki, A., et al., Swelling Behavior Of Montmorillonite Cation Exchanged For ω–Amino Acids By ε–Caprolactam, *J. Mater. Res.,* vol. 8, No. 5, (May 1993), pp. 1174–1178.

Kojima, Y., et al., "One–Pot Synthesis Of Nylon 6–Clay Hybrid", *Journal of Polymer Science: Part A: Polymer Chemistry,* vol. 31, (1993), pp. 1755–1758.

Kojima, Y., et al., "Fine Structure Of Nylon–6–Clay Hybrid", *Journal of Polymer Science: Part B: Polymer Physics,* vol. 32, (1994), pp. 625–630.

Theng, B.K.G., "Clay–Polymer interactions: SumGomary And Perspectives", *Clays and Clay Minerals,* vol. 30, No. 1 (1982), pp. 1–9.

Sugahara, et al., "Clay–Organic Nano–Composite; Preparation of a Kaolinite–Poly(vinylpyrrolidone) Intercalation Compound", *Journal of the Ceramic Society of Japan,* International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science,* vol. 7, 1989 Tokyo, Japan, pp. 243–251.

Wu et al., "Structural, thermal, and electrical characterization of layered nanocomposites derived from sodium–montmorillonite and polyethers", *Chemical Abstracts,* vol. 119, No. 4, Jul. 26, 1993 Columbus, Ohio, US, Abstract No. 31017r.

Bujdak, et al., "The reaction of montmorillonite with octadecylamine in solid and melted state", *Chemical Abstracts,* vol. 118, No. 26, Abstract No. 257609b, p. 166 (Jun. 28, 1993), Columbus, Ohio (US).

Yano, et al., "Synthesis And Properties Of Polyimide–Clay Hybrid", *Polymer Preprints,* ACS, Apr. 1991, pp. 65–66.

Giannelis, et al., "Synthesis And Processing Of Ceramics: Scientific Issues", *Materials Research Society Symposium Proceedings,* vol. 249 (1992), pp. 547–558.

Sanchez Camazano, M. et al., "Factors inlfuencing interactions of organophosphorus pesticides with montmorillonite", *Chemical Abstracts,* vol. 98, No. 19, May 9, 1983, Columbus, Ohio, US, Abstract No. 156367.

Lan, T., et al., "Clay-Epoxy Nanocomposites:Relationships Between Reinforcement Properteis And The Extent Of Clay Layer Exfoliation", *Polym. Mater. Sc. Eng.,* 73, pp. 296–297 (1995).

LeBaron et al., "Polymer–layered silicate nanocomposites: an overview", *App. Clay Sci.,* 15, pp. 11–29 (1999).

Ke et al., "Crystallization, Properties, and Crystal and Nanoscale Morphology of PET–Clay Nanocomposites", *J. Appl. Polym. Sci.,* 71, pp. 1139–1146 (1999).

Kawasumi et al., "Preparation and Mechanical Properties of Polypropylene–Clay Hybrids", *Macromolecules,* 30, pp. 6333–6338 (1997).

Usuki et al., "Synthesis of Propylene–Clay Hybrid", *J. Appl. Polym. Sci.,* 63, pp. 137–139 (1997).

Giannelis, "Polymer Layered Silicate Nanocomposites", *Advanced Materials,* 8, pp. 29–35 (1996).

Kurowaka et al., "Preparation of a nanocomposite of polypropylene and smectite", *J. Materials Science Letters,* 15, pp. 1481–1483 (1996).

Oriakha et al., "Incorporation of poly(acrylic acid), poly(vinylsulfonate) and poly(styrenesulfonate) within layered double hydorxides", *J. Mater. Chem.,* 6, pp. 103–107 (1996).

Messerrsmith et al., Syntheses and Barrier Properties of Poly($\epsilon$–Caprolactone)–Layered Silicate Nanocomposites, *J. of Polym. Sci.,* 33, pp. 1047–1057 (1995).

Pinnavaia et al., "Clay–Reinforced Expoxy Nanocomposites", *Chem. Mater.,* 6, pp. 2216–2219 (1994).

Sugahara et al., Clay–Organic Nano–Composite; Preparation of a Kaolinite–Poly(vinylpyrrolidone) intercalation Compound, *J. Ceramic Society of Japan,* 100, pp. 413–416 (1992).

Yano et al., "Synthesis and properties of polyimide–clay hybrid", *ACS, Polymer Preprints,* 32, pp. 65–66 (1991).

Fukushima et al., "Swelling Behavior of Montmorillonite by Poly–6–Amide", *Clay Minerals,* 23, pp. 27–34 (1988).

Verbicky, *Encyclopedia of Polymer Science and Engineering,* $2^{nd}$ Edition, 12, pp. 364–383 (1988).

Fukushima et al., "Synthesis of an Intercalated Compound of Montmorillonite and 6–Polyamide", *J. Inclusion Phenomena,* 5, pp. 473–482 (1987).

Okada et al., "Synthesis and Characterization of a Nylon 6–Clay Hybrid", *ACS, Polymer Prprints,* 28, pp. 447–448 (1987).

Fahn, et al., "Reaction Products of Organic Dye Molecules with Acid–Treated Montmorillonite", *Clay Minerals,* 18, pp. 447–458 (1983).

* cited by examiner

LAYERED CLAY INTERCALATES AND EXFOLIATES HAVING A LOW QUARTZ CONTENT

CROSS-REFERENCE TO RELATED APPLICATION

This application is a continuation of U.S. application Ser. No. 09/583,120 filed May 30, 2000.

FIELD OF THE INVENTION

The present invention relates generally to polymer-clay nanocomposites comprising a matrix polymer and a layered clay material. The polymer-clay nanocomposites comprising the layered clay material may be processed under normal conditions while achieving low haze and improved oxygen barrier properties. This invention further relates to articles produced from the polymer-clay nanocomposites and processes relating to the nanocomposites.

BACKGROUND OF THE INVENTION

Thermoplastic materials are being increasingly used in the packaging of beverages and perishable foods. Plastics are often the material of choice for food and beverage packaging because of their clarity, flexibility, toughness, high gas barrier, lighter weight, processability and high gloss.

Polymer composites comprising a layered clay material having platelet particles have potential for improved properties, including increased gas barrier, heat deflection temperature, and modulus. However, it has been found that films and articles made from polymer-clay nanocomposites often exhibit increased haze. The origin of this haze is not definitive, but platelet-particle agglomerates, impurities in the clay, crystalline haze, surface inhomogeniety all may contribute to increased haze. The impurities associated with montmorillonite clay, such as quartz, can not be modified to be compatible with the nylon resin molecules. Upon blow molding of the nanocomposite materials in the container fabricating process, voids will be generated around the inorganic particles. The voids may contribute to the haze. Furthermore, processes that include a high degree of orientation, or stretching of a material, often lead to the presence of voids and increased haze. For applications where clarity is important, such as beverage packaging, including beer packaging, films, etc., presence of voids and haze hinders aesthetic appeal and also may significantly affect physical properties of interest, such as gas barrier.

The presence of voids and haze in structures, particularly oriented structures containing polymer-clay composites make such structures less applicable for aesthetic and functional reasons. It is desirable, therefore, to significantly reduce the haze/voids of articles made from polymer-clay platelet particle nanocomposites.

Thus, there remains a need for polymer-clay nanocomposites that result in reduced haze and voids in articles made from such nanocomposites. There is also a need for articles and structures, particularly oriented monolayer and/or multilayer structures, comprising the nanocomposite material.

SUMMARY OF THE INVENTION

The present invention is generally related to polymer-clay nanocomposites. The nanocomposites of this invention result in an acceptable and reduced level of haze and voids, and improved physical properties afforded by the incorporation therein of a layered clay material comprising platelet particles. The reduced level of haze and voids are achieved by reducing the quartz content in the layered clay material.

As embodied and broadly described herein, this invention, in one embodiment, relates to a polymer-clay nanocomposite comprising a melt processable matrix polymer and a layered clay material having less than about 2.0% by weight of quartz, based on the weight of the clay material.

In another embodiment, the present invention relates to a multi-layer article having low haze comprising: (a) at least two structural polymer layers preferably comprising poly (ethylene terephthalate) (PET), or a copolymer thereof; and (b) at least one barrier layer disposed between the at least two structural layers comprising a melt processable matrix polyamide and incorporated therein a layered clay material having less than about 2.0% by weight of quartz, based on the weight of the clay material.

In yet another embodiment, the present invention relates to a process for preparing a polymer-clay nanocomposite comprising the steps of: (i) forming a concentrate comprising an oligomeric resin and a layered clay material having less than about 2.0% by weight of quartz, based on the weight of the clay material; and (ii) melt mixing the concentrate with a melt processable matrix polymer to form a polymer-clay nanocomposite.

In yet another embodiment, the present invention relates to a process for reducing haze in an article having a nanocomposite material comprising: (i) preparing a polymer-clay nanocomposite comprising the step of melt mixing a melt processable matrix polymer and a layered clay material having less than about 2.0% by weight of quartz, based on the weight of the clay material, to form a polymer-clay nanocomposite; and (ii) molding an article from the nanocomposite material, wherein the article has a haze which is at least about 4 percent lower than that of an article formed from a nanocomposite having unpurified clay therein.

Additional advantages of the invention will be set forth in part in the detailed description, including the figures, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

Figure 1:
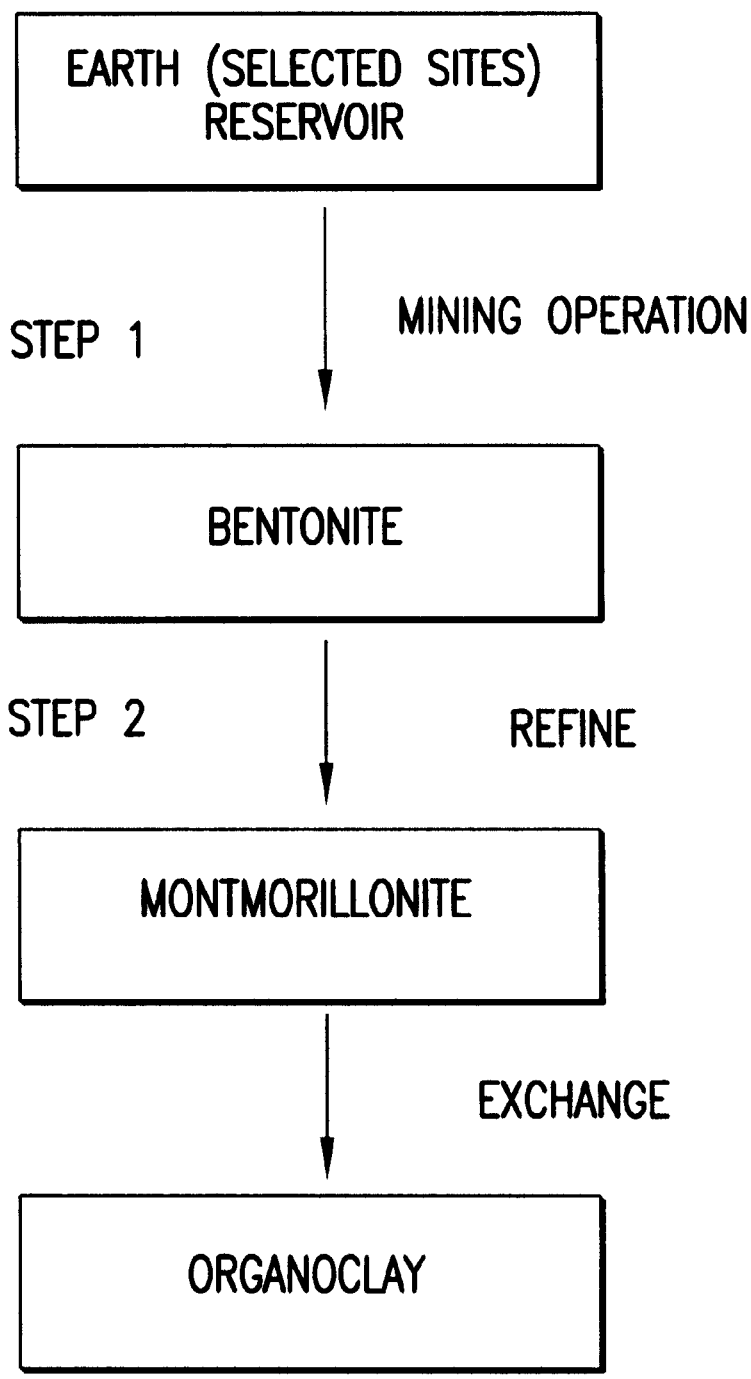
FIG. 1 is flow chart illustrating one embodiment of the steps of a known process for clay purification and cation exchange.

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise. For example, reference to an "article," "container" or "bottle" prepared from the nanocomposites and processes of this invention is intended to include a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Whenever used in this specification, the terms set forth shall have the following meanings:

"Layered clay material," "layered clay," "layered material," "clay material" or "clay" shall mean any organic or inorganic material or mixtures thereof, such as a smectite clay mineral, which is in the form of a plurality of adjacent, bound layers. The layered clay comprises platelet particles and is typically swellable.

"Platelets," "platelet particles" or "particles" shall mean individual or aggregate unbound layers of the layered clay material. These layers may be in the form of individual platelet particles, ordered or disordered small aggregates of platelet particles (tactoids), and/or small aggregates of tactoids.

"Dispersion" or "dispersed" is a general term that refers to a variety of levels or degrees of separation of the platelet particles. The higher levels of dispersion include, but are not limited to "intercalated" and "exfoliated."

"Intercalated" or "intercalate" shall mean a layered clay material that includes treated or organically modified layered clay material having an increase in the interlayer spacing between adjacent platelets particles and/or tactoids. The intercalate may also refer to an "organoclay."

"Exfoliate" or "exfoliated" shall mean platelets dispersed mostly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite" shall mean a polymer and/or copolymer having dispersed therein a plurality of individual platelets obtained from a layered clay material.

"Matrix polymer" shall mean a thermoplastic or thermosetting polymer in which the clay material is dispersed to form a nanocomposite.

The present invention relates to polymer-clay composites that have improved physical properties afforded by the incorporation of clay platelet particles and produce acceptable reduced haze levels for desired applications.

As described above, clay platelet particles in a polymer nanocomposite may induce crystallization, haze and void formation. Without being bound by any particular theory, it is believed that the polymer-clay nanocomposite on processing, such as stretching or orientation of the films, leads to very high levels of haze due to voids and/or from crystallization of the matrix polymer around the dispersed clay particles which renders the polymer nanocomposites less desirable for food packaging applications, for example. This stretch blow molding phenomena can even lead to void and hole formation in the polymer films, which minimizes the usefulness of these compositions in barrier applications.

In one embodiment, we have discovered that using a naturally pure clay and/or a clay purified through a purification process, whereby several impurities including quartz that cause haze and voids are selectively removed from clay, results in novel polymer-clay composite compositions that result in reduced haze and voids (as seen by optical microscopy), as compared to previous polymer-clay platelet particle composites.

The polymer-clay nanocomposite of the present invention having therein the purified or clean low quartz clay has improved barrier to gas when formed into a wall or article compared to a neat polymer formed into the same or similar structure. In addition, these nanocomposites have been found to show unexpected resistance to haze formation, crystallization, void formation and other defect formation in the presence of dispersed and/or exfoliated pure and/or purified clays when undergoing orientation and/or other film or article processing steps.

For comparison, a typical clay purification process is shown in FIG. 1. In step 1, bentonite clay is mined from selected sites (reservoir). In step 2, bentonite clay is refined to produce montmorillonite-type clay. In step 3, the cation-exchange process takes place whereby the sodium ion associated with the montmorillonite is exchanged with an appropriate cation. This step requires exchange reaction time, washing, drying, and possibly grinding. The resulting organoclays produced according to prior processes have been used to produce polymer-platelet compositions in many applications.

The quartz content of a clay material can be quantified by comparing the diffraction peak intensity of the quartz powder X-ray diffraction patterns. The intensity of the diffraction peak has a linear relationship with the quartz content. A calibration curve can be generated with a series known quartz content samples. The calibration peak can be used is at 3.35 Å. In general, the linear regression of the calibration curves is in the range of 0.90 to 0.999. The calibration curve can also be generated with the ratios of the quartz peak (3.35 Å) to the intrinsic clay (e.g., montmorillonite) diffraction peak at (1.50 Å, d060) and the known quartz content in the standard samples. The later calibration curve can eliminate the possible X-ray sample preparation errors.

Low quartz clay (e.g., montmorillonite) can be obtained from mining selections, as well as clay purification processes. In general, for a given clay deposit, modified processing conditions, such as higher centrifugation speed, lower slurry solid content can generate lower quartz clay. The quartz morphology and content remains essentially unchanged in the onium ion modification process.

An improved clay purification process useful in the present invention results in clay platelet particles having a low quartz content. The cleaned or purified clay is used in forming the polymer-clay nanocomposite. According to one embodiment of this invention, bentonite, montmorillonite and other clays can be purified through a series purification process having individual steps, as detailed in U.S. Pat. No. 6,050,509, issued Apr. 18, 2000, the entirety of which is hereby incorporated by reference. The individual steps can be used once or repeated.

In summary, according to one embodiment of the U.S. Pat. No. 6,050,509, montmorillonite clay, for example, is dispersed in water at about 6–10 wt % concentration to form a clay slurry. The clay slurry is passed through a series of hydrocyclones to remove larger particles (impurities) while retaining clay particles having a size of about 100 microns, or less. The clay may be exchanged to 95% Na-form in an ion exchange column and centrifuged. The final purified montmorillonite clay should have particle size less than 10 micron. By varying the slurry concentration, flow rate through the hydrocyclone, and speed of the centrifuge, low quartz clays have been achieved.

Quartz content can be determined by powder X-ray diffraction method based on the relative intensity of quartz diffraction peak at 3.34 Å. Lower quartz montmorillonite has been defined for a clay with less than about 2.0 wt %, preferably less than about 1.5 wt % quartz, more preferably less than 1.0 wt % quartz, based on the weight of the clay material.

In addition to the removal of various impurities present in the clay by the cleaning or purifying process described in U.S. Pat. No. 6,050,509, according to the present invention, further impurities are selectively removed from the clay material by incorporating a cryogenic magnetic separation step in refining the layered clay thereby producing a super-clean clay material. For example, the cryogenic magnetic separation step is a common way to remove iron oxides, such as hematite. The paramagnetic species will move to the magnet surface and leave the clay system. This step may be used from the beginning, but it is more effective to use at the end of a purification process. Moreover, the cryogenic magnetic separation step can, at the least, remove quartz particles ($SiO_2$) present in the unrefined clay.

Quartz particles have been identified as a cause of voids in oriented films containing polymer-clay nanocomposites where the step of cryogenic magnetic separation is not used to refine the clay material. However, low quartz clay particles may also be achieved without a cryogenic magnetic separation step.

Although this invention is generally directed to pure or purified clays, preferably, a clay processed according to the present invention and/or used in the present invention has less than about 2.0% by weight, preferably less than about 1.5% by weight, more preferably less than about 1.0% by weight, even more preferably less than about 0.7% by weight and most preferably less than about 0.5% by weight of quartz particles, based on the weight of the pure or purified clay material.

Some iron oxides are also presented in the initial ores and they may adhere to the sides of montmorillonite clay. Strong magnet fields can be used to separate these iron oxide particles and the iron oxide particles adhered to the montmorillonite clays. The more preferred magnet used in this type of process is a cryogenic superconductor magnet.

The magnet may be a permanent magnet, an electric-induced magnet, or the like. The power levels of the magnet determine the efficiency of the separation process. The resulting purified montmorillonite clays can be dried and milled.

In a particular embodiment, regular clay (e.g., montmorillonite clay) is dispersed into de-ionized water at about 4 wt %. The slurry is sent through a magnetic field range from about 0.8 to about 3 Tesla, at a constant speed, e.g., about 10 gal/min. The magnet field can be generated from permanent magnet or cryogenic magnet. The magnetically purified montmorillonite clay has about 100 wt % of its original ion oxides removed, such as hematite as evidenced from XRD and XRF analysis results.

Thereafter, an organic cation is used to exchange the cations of the clay. For example, about 115% octadecyl ammonium chloride, based on the cation exchange capacity of the montmorillonite clay, may be used to modify the clay surface. The exchange reaction time is about 4 hrs, compared with approximately 1–2 hrs, regular reaction time to ensure complete exchange. The exchanged organoclay is de-watered through filtration. The filter cake is about 20 wt % solid. The filter cake is washed with hot de-ionized water twice. The filter cake is broken into small chunks less than about 0.5 cm, and dried in vented air for two days. The final organoclay is dried in a 50° C. oven for about 4 hr. before fine grinding to reduce particle size. For general organo-montmorillonite clay production, the drying temperature is about 90 to about 120° C. overnight before milling.

The resulting purified and organically-modified organo-montmorillonite clay (S-ODA-PGW) has a much brighter color than the regular clay materials (PGW-ODA), as the color parameters shows in the following Table 1.

TABLE 1

| Sample | Brightness | L* | A* | b* |
| --- | --- | --- | --- | --- |
| S-ODA-PGW | 86 | 96.83 | 0.50 | 4.55 |
| PGW-ODA | 68 | 90.45 | 2.61 | 7.34 |

Furthermore, we have discovered that the cation-exchange process may be improved by providing the longer reaction times to allow complete exchange of the cations, to remove sodium chloride and other impurities present. Moreover, the gentle, low temperature drying conditions, and reduced particle size lead to a further improved organoclay.

This invention also relates to improved montmorillonite clay having a low quartz content and an organoclay that displays improved clarity and physical properties and a process for producing the improved organoclay. Another embodiment of the present invention relates to a polymer-platelet nanocomposite containing an organoclay of the present invention that displays low haze/voids upon orienting and/or stretching.

In one aspect, this invention relates to a low quartz polyamide-clay nanocomposite material comprising a polyamide having dispersed therein platelet particles derived from various clay materials that are pure and/or are purified, and may be untreated or metal intercalated, organically modified through cation exchange, or intercalated with other high molecular weight pretreatment compounds. Any polyamide may be used in the process of this invention. The polyamide nanocomposite is preferably a poly(m-xylylene adipamide) polymer or copolymer nanocomposite having an I.V. of at least about 0.3 dL/g, preferably at least about 0.7 dL/g.

In another aspect, this invention relates to a low quartz polyester-clay nanocomposite material comprising a polyester having dispersed therein platelet particles derived from various clay materials that are pure and/or purified, and may be untreated, metal intercalated, organically modified through cation exchange, or intercalated with other high molecular weight pretreatment compounds. The polyester nanocomposite is preferably a polyethylene terephthalate polymer or copolymer nanocomposite having an I.V. of at least about 0.3 dL/g, preferably at least about 0.5 dL/g.

The polymer-clay nanocomposite of this invention comprises a polymer and up to about 25 weight percent of swellable layered clay material, which is pure and/or purified according to a process of this invention and may in turn be intercalated (organically modified) with an organic cation, preferably an onium ion. The pure and/or purified clay material has a low quartz content and comprises platelet particles, which are dispersed in the matrix polymer.

If desired, other clay treatments may be present during or prior to the formation of the composite by melt mixing for the purposes of aiding exfoliation of the treated or untreated swellable layered particles into the polymer.

Formation of a polymer-clay nanocomposite may be achieved by several different methods. For polyamides, formation of a polyamide-clay nanocomposite includes, but is not limited to, reactive chain extension of an oligomeric polyamide-platelet particle composite, and melt compounding of an oligomeric polyamide composite with a high molecular weight, melt processible polyamide. The monomer unit of the melt processible polyamide may be the same as or different than the oligomeric polyamide.

Processes for forming polyester-clay nanocomposites include, but are not limited to solid state polymerization, melt compounding with melt processible polyester, and/or their combinations. In one embodiment of this invention, the I.V. of an oligomeric polyester-clay composite is increased by solid state polymerization. In another embodiment of this invention, an oligomeric polyester-clay composite is compounded with a melt processible polyester and used as is, or is increased in I.V. by solid state polymerization. The monomer unit of the melt processible polyester may be the same as or different than the oligomeric polyester.

Polymers

Any melt-processible polymer or oligomer may be used in this invention. Illustrative of melt-processible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the preferred polymers are linear or nearly linear, polymers with other architectures, including branched, star, cross-linked and dendritic structures may be used if desired.

The preferred polymers include those materials that are suitable for use in the formation of monolayer and/or multilayer structures with polyesters and can be oriented, and include polyesters, polyamides, polyethylene-co-vinyl alcohols (such as EVOH), and similar or related polymers and/or copolymers. The preferred polyester is poly(ethylene terephthalate) (PET), or a copolymer thereof. The preferred polyamide is poly(m-xylylene adipamide) or a copolymer thereof.

Suitable polyesters include at least one dibasic acid and at least one glycol. A polyester of this invention may comprises the polycondensation polymerization reaction product (or residue) of the glycol component and the dicarboxylic acid component. "Residue," when used in reference to the components of the polyester of this invention, refers to the moiety that is the resulting product of the chemical species in a particular reaction scheme, or subsequent formulation or chemical product, regardless of whether the moiety is actually obtained from the chemical species.

The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

A polyester of this invention may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, terephthalic acid, naphthalene-2,6-dicarboxylic acid, cyclohexanedicarboxylic acid, cyclohexanediacetic acid, diphenyl-4,4'-dicarboxylic acid, phenylenedi(oxyacetic acid), succinic acid, glutaric acid, adipic acid, azelaic acid, sebacic acid, and the like. Polyesters may also be prepared from one or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, and more preferably up to about 15 mole percent of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from one or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

The polyesters of the present invention exhibit an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/tetrachloroethane at a concentration of 0.5 grams per 100 ml. Polyesters having an I.V. within the ranges specified above are of sufficiently high molecular weight to be used in the formation of the articles of the present invention.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta-orpara-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly(hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminononanoic acid (nylon 9), polyundecaneamide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly(octamethylene-adipamide) (nylon 8,6), poly(decamethylene-adipamide) (nylon 10,6), poly(dodecamethylene-adipamide) (nylon 12,6) and poly(dodecamethylene-sebacamide) (nylon 12,8).

The most preferred polyamides include poly(m-xylylene adipamide), polycapramide (nylon 6) and poly(hexamethylene-adipamide) (nylon 6,6). Poly(m-xylylene adipamide) is a preferred polyamide due to its availability, high barrier, and processability.

The polyamides are generally prepared by processes which are well known in the art.

A polyamide of the present invention may comprise the polycondensation polymerization reaction product (or residue) of a diamine component and a dicarboxylic acid component, and/or those prepared by ring opening polymerization of lactams. "Residue," when used in reference to the components of the polyamide of this invention, refers to the moiety that is the resulting product of the chemical species in a particular reaction scheme, or subsequent formulation or chemical product, regardless of whether the moiety is actually obtained from the chemical species.

The polyamides of the present invention exhibit an I.V. of about 0.25 to about 1.5 dL/g, preferably about 0.4 to about 1.2 dL/g, and more preferably of about 0.7 to about 1.0 dL/g. The I.V. is measured at 25° C. in a 60/40 by weight mixture in phenol/tetrachloroethane at a concentration of 0.5 grams per 100 ml. Polyamides having an I.V. within the ranges specified above are of sufficiently high molecular weight to be used in the formation of the articles of the present invention.

Although not necessarily preferred, the oligomers and/or polymers of the present invention may also include suitable additives normally used in polymers. Such additives may be employed in conventional amounts and may be added directly to the reaction forming the oligomer or to the matrix polymer. Illustrative of such additives known in the art include, but are not limited to colorants, pigments, toners, carbon black, glass fibers, fillers, impact modifiers, antioxidants, surface lubricants, denesting agents, UV light absorbing agents, metal deactivators, fillers, nucleating agents, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

The I.V. of an oligomeric polyamide used prior to melt mixing is preferably from about 0.1 to about 0.5 dL/g, and more preferably from about 0.3 dL/g to about 0.5 dL/g, as measured in a mixture of 60 weight percent phenol and 40 weight percent 1,1,2,2-tetrachloroethane at a concentration of 0.5 g/100 ml (solvent) at 25° C. Preferably, the I.V. of the high molecular weight matrix polymer is at least about 0.7 dL/g and more preferably is at least about 1.0 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyamide has a number average molecular weight of from about 200 to about 10,000 g/mol and may be a homo or cooligomer.

The I.V. of an oligomeric polyester used prior to melt mixing is preferably from about 0.05 to about 0.5 dL/g, and more preferably from about 0.1 dL/g to about 0.3 dL/g, as measured in a mixture of 60 weight percent phenol and 40 weight percent 1,1,2,2-tetrachloroethane at a concentration of 0.5 g/100 ml (solvent) at 25° C. Preferably, the I.V. of the high molecular weight matrix polymer is at least about 0.6 dL/g, and more preferably is about 0.7 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyester has a number average molecular weight of from about 200 to about 10,000 g/mol and may be a homo or cooligomer.

Clay Material (Platelet Particles)

The nanocomposite compositions of the present invention comprise up to about 25 weight percent, preferably from about 0.5 to about 20 weight percent, more preferably from about 0.5 to about 15 weight percent, and most preferably from about 0.5 to about 10 weight percent of layered clay material which is pure in that it has a low quartz content or has been purified by any of the processes described herein or by any other known process that would purify or eliminate impurities including quartz from a clay material. The layered clay material comprises platelet particles. The amount of platelet particles is determined by measuring the amount of silicate residue in the ash of the polymer/platelet composition when treated in accordance with ASTM D5630-94.

Useful clay materials include natural, synthetic, and modified phyllosilicates. Natural clays include smectite clays, such as montmorillonite, saponite, hectorite, mica, vermiculite, bentonite, nontronite, beidellite, volkonskoite, magadite, kenyaite, and the like. Synthetic clays include synthetic mica, synthetic saponite, synthetic hectorite, and the like. Modified clays include fluorinated hectorite, fluorinated mica, and the like. Suitable clays are available from various companies including Nanocor, Inc., Southern Clay Products, Kunimine Industries, Ltd., and Rheox.

Generally, the layered clay materials useful in this invention are an agglomeration of individual platelet particles that are closely stacked together like cards, in domains called tactoids. The individual platelet particles of the clays preferably have thickness of less than about 2 mn and diameter in the range of about 10 to about 5000 nm. For the purposes of this invention, measurements refer only to the platelet particle and not any dispersing aids or pretreatment compounds which might be used.

Preferably, the clays are dispersed in the polymer(s) so that most of the clay material exists as individual platelet particles, small tactoids, and small aggregates of tactoids. Preferably, a majority of the tactoids and aggregates in the polymer-clay nanocomposites of the present invention will have thickness in its smallest dimension of less than about 20 nm. Polymer-clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 milliequivalents per gram of mineral (meq/g), preferably from about 0.90 to about 1.5 meq/g, and more preferably from about 0.95 to about 1.25 meq/g. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the cations may be exchanged for organic cations. The exchange may occur by treating a individual clay or a mixture of clays with organic cation or a mixture of organic cations.

Preferred clay materials are phyllosilicates of the 2:1 type having a cation exchange capacity of about 0.5 to about 2.0 meq/g. The most preferred clay materials are smectite clay minerals, particularly sodium bentonite or sodium montmorillonite, more particularly Wyoming-type sodium montmorillonite or Wyoming-type sodium bentonite having a cation exchange capacity from about 0.95 to about 1.25 meq/g. The preferred clays have less than about 2.0 wt % of quartz, as measured by powder X-ray diffraction methods.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

Improvements in gas barrier result from increases in the concentration of platelet particles in the polymer. While amounts of platelet particles as low as about 0.01 percent provide improved barrier (especially when well dispersed and ordered), compositions having at least about 0.5 weight percent of the platelet particles are preferred because they display the desired improvements in gas barrier.

Prior to incorporation into an oligomer(s) or polymer(s), the particle size of the clay material may be reduced in size by methods known in the art, including, but not limited to, grinding, pulverizing, hammer milling, jet milling, and their combinations. It is preferred that the average particle size be reduced to less than about 100 micron in diameter, more preferably less than about 50 micron in diameter, and most preferably less than about 20 micron in diameter.

The clay material of this invention may comprise refined or purified but unmodified clays, modified clays, or mixtures of modified and unmodified clays. Generally, it is desirable to treat the selected clay material to facilitate separation of the agglomerates of platelet particles to individual platelet particles and small tactoids. Separating the platelet particles prior to incorporation into the polymer also improves the polymer/platelet interface. Any treatment that achieves the above goals may be used.

Many clay treatments used to modify the clay for the purpose of improving dispersion of clay materials are known and may be used in the practice of this invention. The clay treatments may be conducted prior to, during, or after mixing the clay material with the polymer.

Organic Cations

In an embodiment of this invention, a pure, purified, modified or treated layered clay material or mixture of clay material is prepared by the reaction of a swellable layered clay(s) with an organic cation (to effect partial or complete cation exchange), preferably an ammonium compound. If desired, two or more organic cations may be used to treat the clay. Moreover, mixtures of organic cations may also be used to prepare a treated layered clay material. The process to prepare the organoclays (modified or treated clays) may be conducted in a batch, semi-batch, or continuous manner.

Organic cations used to modify a clay material or a mixture of clay materials of a nanocomposite of this invention are derived from organic cation salts, preferably onium salt compounds. Organic cation salts useful for the nanocomposite and process of this invention may generally be represented by the following formula (I):

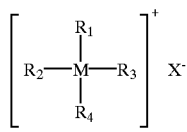
(I)

wherein M is either nitrogen or phosphorous; $X^-$ is a halide, hydroxide, or acetate anion, preferably chloride and bromide; and $R_1$, $R_2$, $R_3$, and $R_4$ are independently organic and/or oligomeric ligands or may be hydrogen.

Examples of useful organic ligands include, but are not limited to linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to poly(alkylene oxide), polystyrene, polyacrylate, polycaprolactone, and the like.

Examples of useful organic cations include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to alkyl ammonium ions such as dodecyl ammonium, octadecyl trimethyl ammonium, bis(2-hydroxyethyl) octadecyl methyl ammonium, octadecyl benzyl dimethyl ammonium, and the like or mixtures thereof.

Useful alkoxylated ammonium compounds may include mono-alkoxylated, di-alkoxylated, tri-alkoxylated, and tetra-alkoxylated ammonium compounds. Examples of useful alkoxy ligands include, but are not limited to hydroxyethyl, hydroxypropyl, hydroxybutyl, poly(ethylene oxide), poly(propylene oxide), poly(butylene oxide), and the like.

Useful mono-alkoxylated ammonium salts can be represented as follows:

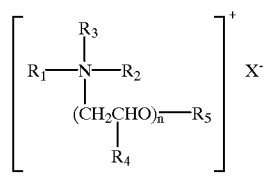

wherein N represents nitrogen; $X^-$ represents an anion which is preferably a halide atom such as chloride or bromide; $R_1$, $R_2$, and $R_3$ may be the same or different and are selected from organic and oligomeric ligands comprising 1 to carbon atoms or may be hydrogen; n is at least 1; $R_4$ is selected from hydrocarbons comprising 1 to 4 carbon atoms, hydrogen, and their mixtures; and $R_5$ is selected from hydrocarbons comprising 1 to 7 carbon atoms and hydrogen. Illustrative of suitable mono-alkoxylated amine compounds, which are converted to the ammonium salt by reaction with a Bronsted acid, include, but are not limited to those under the trade name of JEFFAMINE.

Useful di-alkoxylated ammonium salts can be represented as follows:

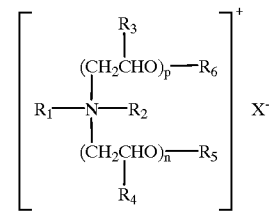

wherein N represents nitrogen; $X^-$ represents an anion which is preferably a halide atom such as chloride or bromide; $R_1$ and $R_2$ may be the same or different and are selected from organic and oligomeric ligands comprising 1 to 30 carbon atoms or may be hydrogen; p and n are at least 1; and $R_3$, $R_4$, $R_5$ and $R_6$ may be same or different and are selected from hydrocarbons comprising 1 to 4 carbon atoms and hydrogen. Examples of useful di-alkoxylated ammonium compounds include, but are not limited to bis(2-hydroxymethyl), octadecyl ammonium, bis(2-hydroxyethyl), octadecylmethyl ammonium, octadecylisopropoxydimethyl ammonium, and the like or mixtures thereof.

Useful tri-alkoxylated ammonium salts can be represented as follows:

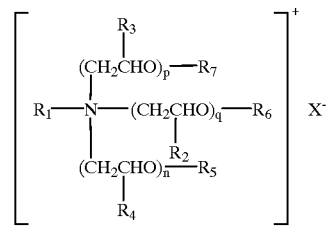

wherein N represents nitrogen; $X^-$ represents an anion which is preferably a halide atom such as chloride or bromide; $R_1$ is selected from organic and oligomeric ligands comprising 1 to 30 carbon atoms or may be hydrogen; n, p, and q are at least 1; and $R_2$, $R_3$, $R_4$, $R_5$, $R_6$ and $R_7$ may be same or different and are selected from hydrocarbons comprising 1 to 4 carbon atoms and hydrogen.

Useful tetra-alkoxylated ammonium salts can be represented as follows:

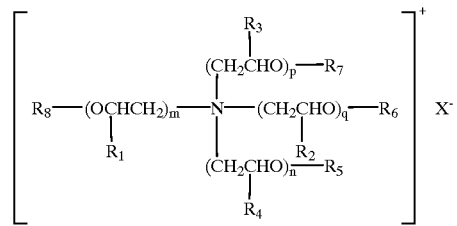

wherein N represents nitrogen; $X^-$ represents an anion which is preferably a halide atom such as chloride or bromide; m, n, p and q are at least 1; and $R_1$, $R_2$, $R_3$, $R_4$, $R_5$, $R_6$, $R_7$ and $R_8$ may be same or different and are selected from hydrocarbons comprising 1 to 4 carbon atoms and hydrogen.

The preferred alkoxylated ammonium salts are di-ethoxylated ammonium salts represented as follows:

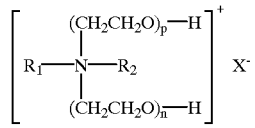

wherein N represents nitrogen; X⁻ represents an anion which is preferably a halide atom such as chloride or bromide; $R_1$ is selected from organic and oligomeric ligands comprising at least 8 carbon atoms; $R_2$ is selected from organic and oligomeric ligands comprising at least 8 carbon atoms or may be hydrogen; and p and n are at least 1.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units.

Numerous methods to modify layered clays with organic cations are known, and any of these may be used in the practice of this invention. One embodiment of this invention is the organic modification of a layered clay with an organic cation salt by the process of dispersing a layered clay or mixture of clays into hot water, most preferably from about 50 to about 80° C., adding (neat or dissolved in water or alcohol) the organic cation salt or an organic amine and a Bronsted acid (thereby forming the organic ammonium salt in situ) separately or adding mixtures thereof with agitation, then blending for a period of time sufficient for the organic cations to exchange most of the metal cations present in the galleries between the layers of the clay material(s). Then, the purified and organically-modified layered clay material(s) is isolated by methods known in the art including, but not limited to, filtration, centrifugation, spray drying, and/or their combinations.

The particle size of the organoclay material may be reduced in size by methods known in the art, including, but not limited to, grinding, pulverizing, hammer milling, jet milling, and/or their combinations. It is preferred that the average particle size be reduced to less than about 100 micron in diameter, more preferably less than about 50 micron in diameter, and most preferably less than about 20 micron in diameter. It is important to remove large size particles, as they cause increased haze and voids.

It is desirable to use a sufficient amount of the organic cation salt(s) to permit exchange of most of the metal cations in the galleries of the layered particle for the organic cation(s); therefore, at least about 0.5 equivalent of total organic cation salt is used and up to about 3 equivalents of organic cation salt can be used. It is preferred that about 0.5 to about 2 equivalents of organic cation salt be used, more preferable about 1.0 to about 1.5 equivalents. It is preferable to remove most of the metal cation salt(s) and most of the excess organic cation salt(s) by washing and other techniques known in the art. The presence of the metal salts, such as sodium chloride, may lead to increased haze and voids.

The organoclays of the present invention having reduced impurity may be incorporated into suitable matrix polymers such as polyamides by any processes which are known in the art.

Other Clay Treatments

The layered clay material may be further treated for the purposes of aiding exfoliation in the composite, increasing the molecular weight and/or improving the strength of the polymer/clay interface. Any treatment that achieves the above goals may be used. Increasing the molecular weight of the polyamide-platelet particle composite may be achieved by several different methods including, but not limited to, reactive chain extension, solid state polymerization, crosslinking, and melt compounding with a high molecular weight, melt processible polyamide.

Examples of useful treatments include, but are not limited to intercalation with water-soluble or water-insoluble polymers, organic reagents or monomers, silane compounds, metals or organometallics, expanding agents, oligomeric polymers, dispersing aids and/or their combinations. Treatment of the clay can be accomplished prior to the addition of a polymer to the clay material, during the dispersion of the clay with the polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the clay material include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Examples of suitable water dispersible compounds include sulfonated polymers such as sulfonated polyesters and sulfonated polystyrene.

If desired, a dispersing aid may be present during or prior to the formation of the composite for the purposes of aiding exfoliation of the treated or untreated swellable layered particles into the polymer. Many such dispersing aids are known and cover a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 9 times the amount of the platelet particles.

Articles

The polymer-clay nanocomposite of this invention may be formed into articles by conventional plastic processing techniques. Molded articles may be made from the above-described polymers by compression molding, blow molding, extrusion or other such molding techniques, all of which are known in the art. Monolayer and/or multilayer articles prepared from the nanocomposite material of this invention include, but are not limited to film, sheet, pipes, tubes, profiles, molded articles, preforms, stretch blow molded films and containers, injection blow molded containers, extrusion blow molded films and containers, thermofomied articles and the like. The containers are preferably bottles.

Oriented articles produced from the present polymer-clay compositions are also expected to have low haze and reduced voids. Composite compositions produced according to the present invention are especially useful for preparing clear bottles and film (low haze) that may also exhibit improved gas barrier properties. Additionally, products produced from these composites can achieve lower haze and possibly higher gas barrier properties than products produced from conventional polymer-clay composites.

In forming stretch blow molded bottles of one or several layers, it is often customary to initially form a preform of the desired vessel via an injection molding process. The crystallization rate of the materials comprising the preform must be sufficiently slow to allow the formation of an essentially noncrystalline article. Unless the preform is essentially noncrystalline, it is exceedingly difficult to stretch blow mold into the desired shape to form a bottle. In one embodiment of this invention, the layered silicate materials and treatment compounds are selected both to promote dispersion of the individual platelets into the polymer, e.g., polyamide to allow maximum barrier enhancement, minimum haze formation, and the formation of preforms by injection molding which are essentially noncrystalline in character.

The bottles and containers of this invention provide increased shelf storage life for contents, including beverages and food that are sensitive to the permeation of gases. Articles, more preferably containers, of the present invention often display a gas transmission or permeability rate (oxygen, carbon dioxide, water vapor) which is at least about 10% lower (depending on clay concentration) than that of similar containers made from clay-free polymer, resulting in correspondingly longer product shelf life provided by the container. Desirable values for the sidewall modulus and tensile strength may also be maintained. The articles also show unexpected resistance to haze formation, crystallization, void and other defect formation.

The articles may also be multilayered. Preferably, the multilayered articles have a nanocomposite material disposed between other layers, although the nanocomposite may also be one layer of a two-layered article. In embodiments where the nanocomposite and its components are approved for food contact, the nanocomposite may form the food contact layer of the desired articles. In other embodiments, it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment, co-extruding a layer of the polymer-clay nanocomposite specified above with some other suitable thermoplastic resin may form articles. The polymer-clay nanocomposite and the molded article and/or extruded sheet may also be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the polymer-clay nanocomposite layer being sandwiched between two outer polymer layers, the surface roughness is often considerably less than for a monolayer nanocomposite material. Thus, with a multilayer approach, the level of haze may be further reduced.

Nanocomposite Processes

The polymer-clay nanocomposites of this invention may be prepared with the matrix polymer and layered clay material in different ways. Many processes to prepare polymer-clay nanocomposite compositions are known, and any of these processes may be used to prepare the composites of this present invention.

In one embodiment of this invention, the melt mixing step is achieved by dry mixing polymer with a layered clay having a low quartz content and passing the mixture through a compounding extruder under conditions sufficient to melt the polymer.

In another embodiment of this invention, the melt-mixing step is conducted by feeding the polymer and treated or untreated layered particles separately into a compounding extruder. When treated layered particles are used in this process, it is usually preferred that the polymer be added first to minimize degradation of treated layered particles.

This invention also relates generally to a process comprising the steps of (1) preparing an oligomeric resin-platelet particle composite by melt mixing a low quartz clay material comprising platelet particles and an oligomeric resin and (2) preparing a high molecular weight polymer-clay nanocomposite material.

In a one embodiment of this process, the steps comprise: (i) melt mixing platelet particles with a matrix polymer-compatible oligomeric resin to form an oligomeric resin-clay composite, and (ii) mixing the oligomeric resin-clay composite with a high molecular weight matrix polymer thereby increasing the molecular weight of the oligomeric resin-platelet particle composite and producing a polymer nanocomposite material.

In another embodiment of the first embodiment, the melt-mixing step is conducted by feeding the oligomeric resin and treated or untreated layered particles separately into a compounding extruder. When treated layered particles are used in this process, it is preferred that the oligomeric resin be added first to minimize degradation of treated layered particles.

Melt processing or mixing includes melt and extrusion compounding. Use of extrusion compounding to mix the clay and the polymer presents two advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin. Moreover, use of extrusion compounding to mix the clay and the polymer is preferred because of the ease of preparation and the potential to attain high clay loadings.

In another embodiment of this invention, a high concentration of layered particles is melt mixed with oligomeric resin by mixing in a reactor. The resulting composite material is then either chain extended, polymerized to high molecular weight, or let down in the extruder into a high molecular weight polymer to obtain the final nanocomposite material.

The oligomeric resin and the high molecular weight polymer may have the same or different repeat unit structure, i.e., may be comprised of the same or different monomer units. Preferably, the oligomeric resin has the same monomer unit to enhance compatibility or miscibility with the high molecular weight polymer.

In another embodiment of this invention, molten oligomeric resin may be fed directly to a compounding extruder along with treated or untreated layered particles to produce the oligomeric resin-platelet particle nanocomposite.

If desired, a dispersing aid may be present during or prior to the formation of the composite by melt mixing for the purposes of aiding exfoliation of the treated or untreated swellable layered particles into the polymer. Many such dispersing aids are known covering a wide range of materials including water, alcohols, ketones, aldehydes, chlorinated solvents, hydrocarbon solvents, aromatic solvents, and the like or combinations thereof.

The molecular weight of the polymer material may be increased by any of a number of known approaches or by any combination of these approaches, e.g., chain extension, reactive extrusion, extrusion let-down, solid state polymerization or annealing, annealing under a flow of inert gas, vacuum annealing, let-down in a melt reactor, etc.

Although any melt mixing device may be used, typically, melt mixing is conducted either by a batch mixing process or by a melt compounding extrusion process during which treated or untreated layered clay particles are introduced into an oligomeric or polymeric resin. Prior to melt mixing, the treated or untreated layered particles may exist in various forms including pellets, flakes, chips and powder. It is preferred that the treated or untreated layered particles be reduced in size by methods known in the art, such as hammer milling and jet milling. Prior to melt mixing, the oligomeric or polymeric resin may exist in wide variety of forms including pellets, ground chips, powder or its molten state.

As exemplified above, the layered clay having a low quartz content and the matrix polymer components of the nanocomposite of this invention may be combined in a wide variety of ways that are known to those skilled in the art. Therefore, it will be apparent to those skilled in the art that various modifications and variations can be made to the processes embodied above without departing from the scope of the invention. Other embodiments of the invention will be apparent to those skilled in the art from consideration of the specification and practice of the invention disclosed herein. It is intended that the description of the above embodiments not be limiting.

The resulting nanocomposite can then be processed into the desired barrier article, film or container with article-forming methods well known in the art. For example, the nanocomposite may then be processed either as an injected molded article, e.g., a container preform or an extruded film or sheet. Additional processing of stretch blow molding to a container or bottle, or extruding as a barrier film yields high barrier finished articles with low haze and reduced voids. Polymer nanocomposites and articles produced according to the present invention display a gas permeability, which is at least 10 percent lower than that of the unmodified polymer.

EXAMPLES

The following examples and experimental results are included to provide those of ordinary skill in the art with a complete disclosure and description of particular manners in which the present invention can be practiced and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in ° C. or is at ambient temperature, and pressure is at or near atmospheric.

Example 1

Example 1 illustrates one embodiment of a nanocomposite of the present invention.

MXD6 6007, poly(m-xylylene adipamide) with an I.V. of about 1.1 dL/g, was purchased from Mitsubishi Chemical Co. The organo-montmorillonite clay (PGC-Q182) was provided by Nanocor Inc. of Arlington Heights, Ill. The clay has a quartz content of 0.33 wt % determined from X-ray diffraction method. Also, this organoclay has a $Na^+$ content of 0.12 wt %, as determined by X-ray diffraction.

The organo-montmorillonite clay was prepared by onium ion exchanging Na-montmorillonite with bis(2-hydroxyethyl) octadecyl methyl ammonium chloride. The finished product was washed with alcohol/water mixture to remove excess surfactant then dried and milled. The tether on the clay is bis(2-hydroxyethyl) octadecyl methyl ammonium.

D(ND), a low molecular weight m-xylyladipamide polyamide was purchased from Polymer Chemistry Innovations. This material was analyzed by titration of the amine and carboxylate end groups to possess a number average molecular weight of about 3,000, and was determined to have an I.V. of about 0.41 dL/g. 1421.8 grams of this oligomeric poly(m-xylyladipoyl diamine) was dry mixed with 378.2 grams of organomontmorillonite clay from Nanocor, Inc. Prior to dry mixing, the individual components were dried at 80C. under vacuum for 24 hours. The mixture was then extruded on the Leistritz Micro 18 co-rotating twin screw extruder equipped with a general compounding screw. The AccuRate pellet feeder was set at a rate of approximately 2 kg/hr with a nitrogen atmosphere over both the feeder and the hopper. The barrel and die temperatures were set at 240C. and the screw RPM at approximately 200.

After the extrusion was complete, 1666.7 grams of the extrudate pellets are dry-mixed with 8333.3 grams of MXD6 6007 polyamide. The mixture was then extruded on the Werner-Pflider 30 mm twin screw extruder at a processing temperature of 260C. and a screw RPM of 300 at a feed rate of about 30 lb/hr. The final material was analyzed for ash content and it was determined to be 2.53%.

Figure 2:
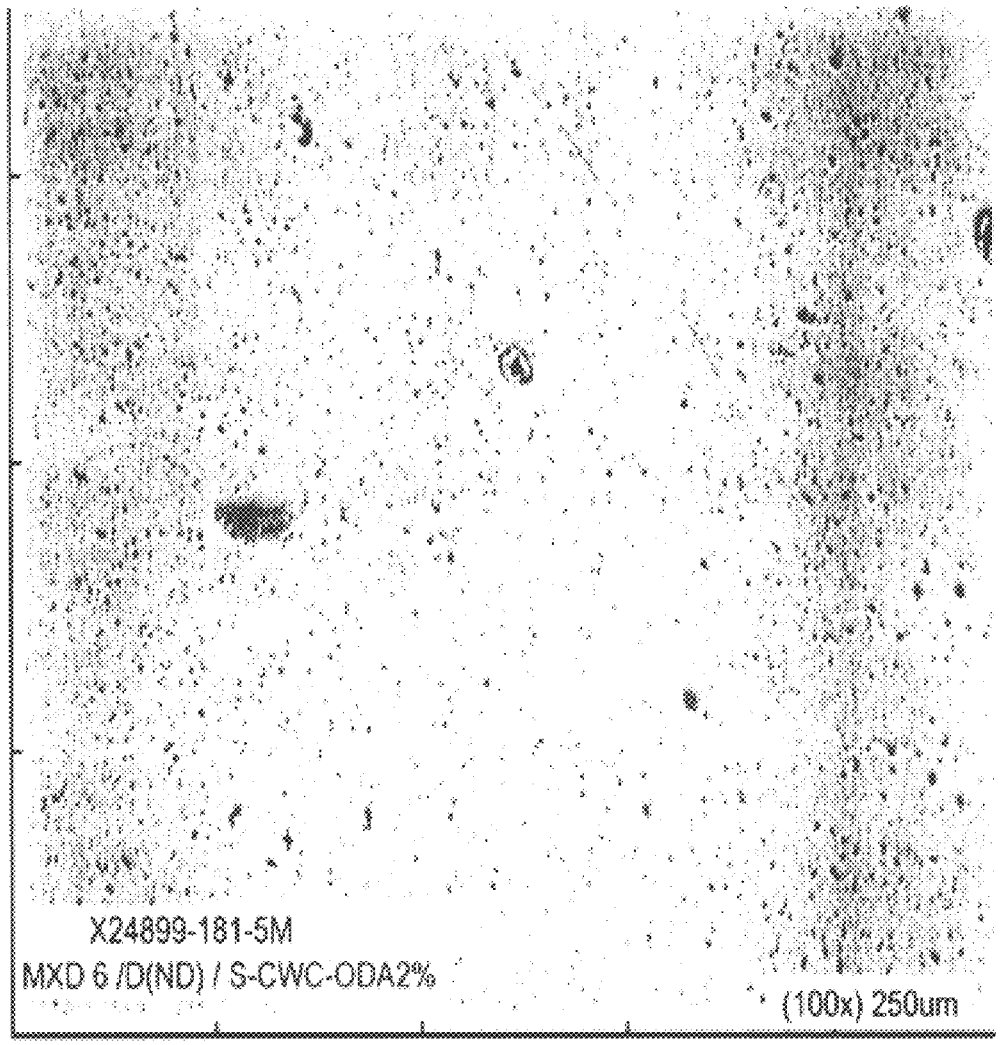
FIG. 2 is an optical photograph at 100× magnification of an article wall layer produced from the nanocomposite of Example 3.
Figure 3:
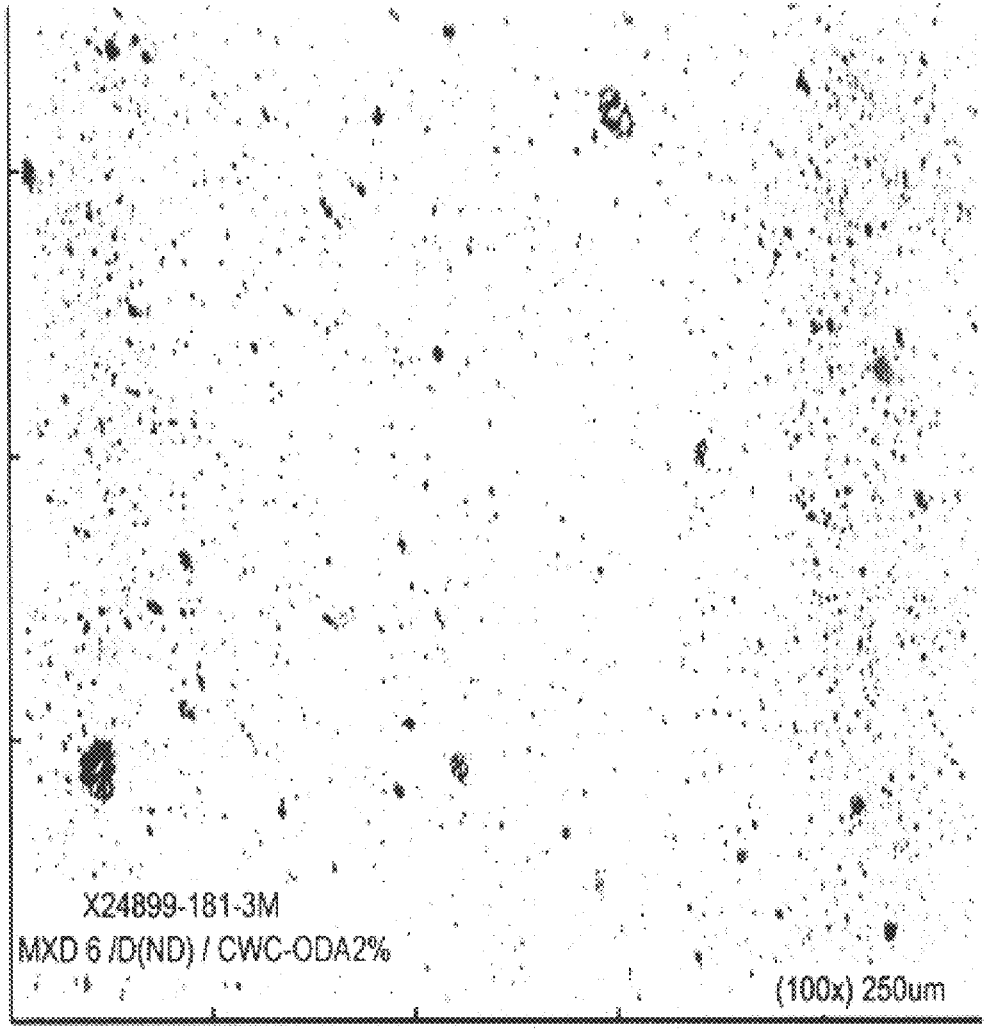
FIG. 3 is an optical photograph at 100× magnification of an article wall layer produced from the nanocomposite of the Comparative Example 3.

The resulting nanocomposite material, designated as MXD6/D(ND)/organoclay 2.53%, was used as the middle layer of co-injected trilayer preforms. The ash content of the resulting nanocomposite was 2.53%. The inner and outer layers of the trilayer preform were made from Eastman's amber colored PET 20261, having about 0.80 dL/g I.V. The nominal thickness of the middle layer was about 8% of the total thickness. The preforms were stretch blow molded on Sidel SBO ⅔ machine into 16 oz. beer bottle. The bottle sidewall was cut and the middle layer containing the nanocomposite material was peeled from the three-layer configuration, and analyzed for haze, oxygen permeability and optical microscopy. The haze of the middle layer was 8%. The haze was determined by ASTM test method D-1003. The middle layer was also subjected to optical microscopy and relatively fewer voids were observed as compared to the film of Comparative Example 2 (See FIGS. 2 and 3).

Examples 2a–2e and Comparative Example 1f

Examples 2a–2e illustrate various embodiments of the present invention. Example 1f is a comparative example. Example 2g is a control sample having only MXD6 in the middle layer.

MXD6 6007, poly(m-xylylene adipamide) with an I.V. of about 1.1 dL/g, was purchased from Mitsubishi Chemical Co. The organo-montmorillonite clays (Nanomer types) were provided by Nanocor Inc. of Arlington Heights, Ill. The quartz content of the clay is shown in Table 2.

The montmorillonite clays were purified by the process described in their U.S. Pat. No. 6,050,509, and the organo-montmorillonite clay was supplied by Nanocor, Inc., Arlington Heights, Ill. The modified montmorillonite clay was washed extensively until free of non-exchanged surfactant, and then dried and milled. D(ND), a low molecular weight m-xylyladipamide polyamide was purchased from Polymer Chemistry Innovations. This material was analyzed by titration of the amine and carboxylate end groups to possess a number average molecular weight of about 3,000 g/mol, and was determined to have an I.V. of about 0.41 dL/g. 21.1% by weight of the oligomeric poly(m-xylyladipoyl diamine), 3.9% of organo-montmorillonite from Nanocor, Inc. and 75% by wt. of MXD6-6007 from Mitsubishi Chemical Co. were then extruded on the 57 mm twin screw extruder equipped with a general compounding screw. The barrel and die temperatures were set at about 270° C.

The final materials were analyzed for ash content and are listed in Table 2.

The resulting nanocomposite materials, (Examples 2a–2e and Comparative Example 1f), were used as the middle layer of co-injected trilayer preforms. Sample 2g (no clay) was prepared using MXD6-6007 in the middle layer. The inner and outer layers of the trilayer preform were made from Eastman Chemical Company PET 9921W, having about 0.80 dL/g I.V. The nominal thickness of the middle layer was about 10% of the total thickness. The preforms were stretch blow molded on a Sidel SBO ⅔ machine into 16 oz. bottle. The bottle sidewall was cut and the middle layer containing the nanocomposite material for samples 2a through 2e, Comparative Example 1f, and M6-6007 for sample 2g was peeled from the three-layer configuration, and analyzed for haze and oxygen permeability.

The oxygen barrier of the film was then determined by ASTM test method D-3985 at 30° C. and 50% relative humidity with a pure oxygen gas permeant and a nitrogen gas carrier on a Mocon 2/20 oxygen permeability tester. The oxygen permeability of the middle layer containing the nanocomposite was at least 20% lower for samples 2a–2e and Comparative Example 1f than for sample 2g. The haze of the middle layer is shown in Table 2. The haze was determined by ASTM test method D-1003. As shown in Table 2, as the quartz weight percent decreases, the haze decreases. Moreover, the middle layer was also subjected to optical microscopy and relatively fewer voids were observed in samples 2a, 2b, 2c, 2d and 2e, compared to sample 1f, a comparative example.

TABLE 2

| Example | NanomerType | Quartz Wt. (%) | Ash (%) | Middle Layer Thickness (mils) | Middle Layer Haze |
|---|---|---|---|---|---|
| 2a | NA-047-00 | 0.33 | 2.2 | 1.63 | 8.6 |
| 2b | NX-041-00A | 0.55 | 2.1 | 1.68 | 8.1 |
| 2c | NX-039-00A | 0.79 | 2.6 | 1.58 | 12.4 |
| 2d | NV-049-00 | 1.58 | 2 | 1.8 | 13.9 |
| 2e | NN-049-00 | 1.93 | 2.1 | 1.8 | 14.8 |
| Comparative Example 1f | NN-195-99 | 3.7 | 2.5 | 1.7 | 23 |
| 2g | None | 0 | 0 | 1.7 | 0.9 |

Example 3

Example 3 illustrates one embodiment of a nanocomposite of the present invention.

MXD6 6007, poly(m-xylylene adipamide) with an I.V. of about 1.1 dL/g, was purchased from Mitsubishi Chemical. The super clean or purified organo-montmorillonite clay (S-PGW-ODA) was provided by Nanocor Inc. of Arlington Heights, Ill. This clay was produced by using the super-clean process of the present invention.

That is, S-PGW-ODA was prepared by using cryogenic magnetically purified octadecyl ammonium-montmorillonite clay (Nanocor, Inc., Arlington Heights, Ill.). Protonated octadecyl ammonium (ODA) up to excess of 100% of the clay PGW was used to exchange the inorganic $Na^+$ or $Ca^{2+}$ out. The modified montmorillonite clay was washed extensively until free of non-exchanged surfactant, and then dried and milled. The tether on the clay is octadecyl ammonium. 100% of the PGW was utilized. D(ND), a low molecular weight m-xylyladipamide polyamide was purchased from Polymer Chemistry Innovations. This material was analyzed by titration of the amine and carboxylate end groups to possess a number average molecular weight of about 3,000, and was determined to have an I.V. of about 0.41 dL/g. 1421.8 grams of this oligomeric poly(m-xylyladipoyl diamine) was dry mixed with 378.2 grams of S-PGW-ODA organo-montmorillonite clay from Nanocor, Inc. Prior to dry mixing, the individual components were dried at 80° C. under vacuum for 24 hours. The mixture was then extruded on the Leistritz Micro 18 co-rotating twin screw extruder equipped with a general compounding screw. The AccuRate pellet feeder was set at a rate of approximately 2 kg/hr with a nitrogen atmosphere over both the feeder and the hopper. The barrel and die temperatures were set at 240° C. and the screw RPM at approximately 200.

After the extrusion was complete, 1666.7 grams of the extrudate pellets are dry-mixed with 8333.3 grams of MXD6 6007 polyamide. The mixture was then extruded on the Werner-Pfleider 30 mm twin screw extruder at a processing temperature of 260° C. and a screw RPM of 300 at a feed rate of about 30 lb/hr. The final material was analyzed for ash content and it was determined to be 2.53%.

The resulting nanocomposite material, designated as MXD6/D(ND)/S-PGW-ODA 2.53%, was used as the middle layer of co-injected trilayer preforms. The ash content of the resulting nanocomposite was 2.53%. The inner and outer layers of the trilayer preform were made from Eastman's amber colored PET 20261, having about 0.80 dL/g I.V. The nominal thickness of the middle layer was about 8% of the total thickness. The preforms were stretch blow molded on Sidel SBO ⅔ machine into 16 oz. beer bottle. The bottle sidewall was cut and the middle layer containing the nanocomposite material was peeled from the three-layer configuration, and analyzed for haze, oxygen permeability and optical microscopy.

The oxygen barrier of the film was then determined by ASTM test method D-3985 at 30° C. and 50% relative humidity with a pure oxygen gas permeant and a nitrogen gas carrier on a Mocon 2/20 oxygen permeability tester to be 0.13 cc mil/100 in$^2$-24 hr.-atm. The haze of the middle layer was 11.1%. The haze was determined by ASTM test method D-1003. The middle layer was also subjected to optical microscopy and relatively fewer voids were observed as compared to the film of Comparative Example 2 (See FIGS. 2 and 3.)

Comparative Example 2

In this example, instead of using super clean or purified S-PGW-ODA clay, the clay was prepared via regular process (FIG. 1) and is designated as only, type PGW-ODA. The procedure of Example 3 of the invention was essentially repeated. MXD6 6007, poly(m-xylylene adipamide) with I.V. of about 1.1 dL/g was purchased from Mitsubishi Chemical. The regular non-purified PGW-ODA organomontmorillonite clay was provided by Nanocor, Inc. of Arlington Heights, Ill. This clay was produced by using a conventional process. Standard PGW-ODA was prepared by using purified Na-montmorillonite clay (Nanocor, Inc., Arlington Heights, Ill.). Protonated octadecyl ammonium (ODA) up to excess of 25% of the PGW clay was used to exchange the inorganic Na$^+$ or Ca$^{2+}$ cations. The modified montmorillonite clay was washed extensively until free of non-exchanged surfactant, and then dried and milled. The tether on the clay is octadecyl ammonium. 100% of the PGW was utilized.

D(ND), a low molecular weight m-xylyladipamide polyamide was purchased from Polymer Chemistry Innovations. This material was analyzed by titration of the amine and carboxylate end groups to possess a number average molecular weight of about 3,000, and was determined to have an I.V. of about 0.41 dL/g. 4734.6 grams of this oligomeric poly(m-xylyladipoyl diamine) was dry mixed with 1265.38 grams of PGW-ODA organo-montmorillonite clay from Nanocor, Inc. Prior to dry mixing, the individual components were dried at 80° C. under vacuum for 24 hours. The mixture was then extruded on the Leistritz Micro 18 co-rotating twin screw extruder equipped with a general compounding screw. The AccuRate pellet feeder was set at a rate of approximately 2 kg/hr with a nitrogen atmosphere over both the feeder and the hopper. The barrel and die temperatures were set at 240° C. and the screw RPM at approximately 200.

After the extrusion was complete, 1666.7 grams of the extrudate pellets are dry-mixed with 8333.3 grams of M6 6007 polyamide. The mixture was then extruded on the Werner-Pfleider 30 mm twin screw extruder at a processing temperature of 260° C. and a screw RPM of 300 at a feed rate of about 30 lb/hr. The final material was analyzed for ash content and it was determined to be 2.41%.

The resulting nanocomposite material, designated as MXD6/D(ND)/PGW-ODA 2.41%, was used as the middle layer of co-injected trilayer preforms. The ash content of the resulting nanocomposite was 2.41%. The inner and outer layers of the trilayer preform were made from Eastman's amber colored PET 20261, having about 0.80 dL/g I.V. The nominal thickness of the middle layer was about 8% of the total thickness. The preforms were stretch blow molded on Sidel SBO ⅔ machine into 16 oz. bottles. The bottle sidewall was cut and the middle layer containing the nanocomposite material was peeled from the three-layer configuration, and analyzed for haze, oxygen permeability and optical microscopy.

The oxygen barrier of the film was then determined by ASTM test method D-3985 at 30° C. and 50% relative humidity with a pure oxygen gas permeant and a nitrogen gas carrier on a Mocon 2/20 oxygen permeability tester to be 0.15 cc mil/100 in$^2$-24 hr.-atm. The haze of the middle layer was 15.8%. The haze was determined by ASTM test method D-1003. The middle layer was also subjected to optical microscopy (see FIG. 3) and relatively more voids were observed as compared to the film of Example 3 (See FIGS. 2 and 3).

Figure 4A:
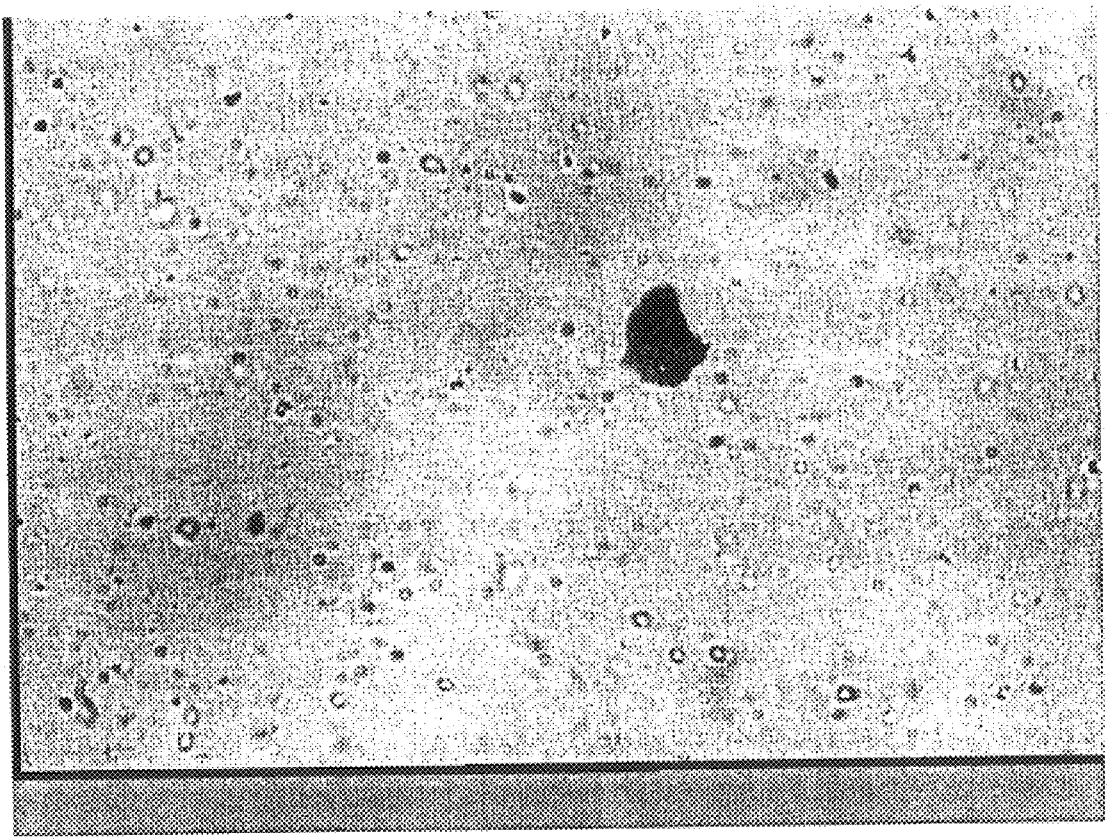
FIG. 4A is an optical photograph at 400× magnification of a trilayer film before biaxially stretching having a middle layer produced from the nanocomposite of the Comparative Example 3.
Figure 4B:
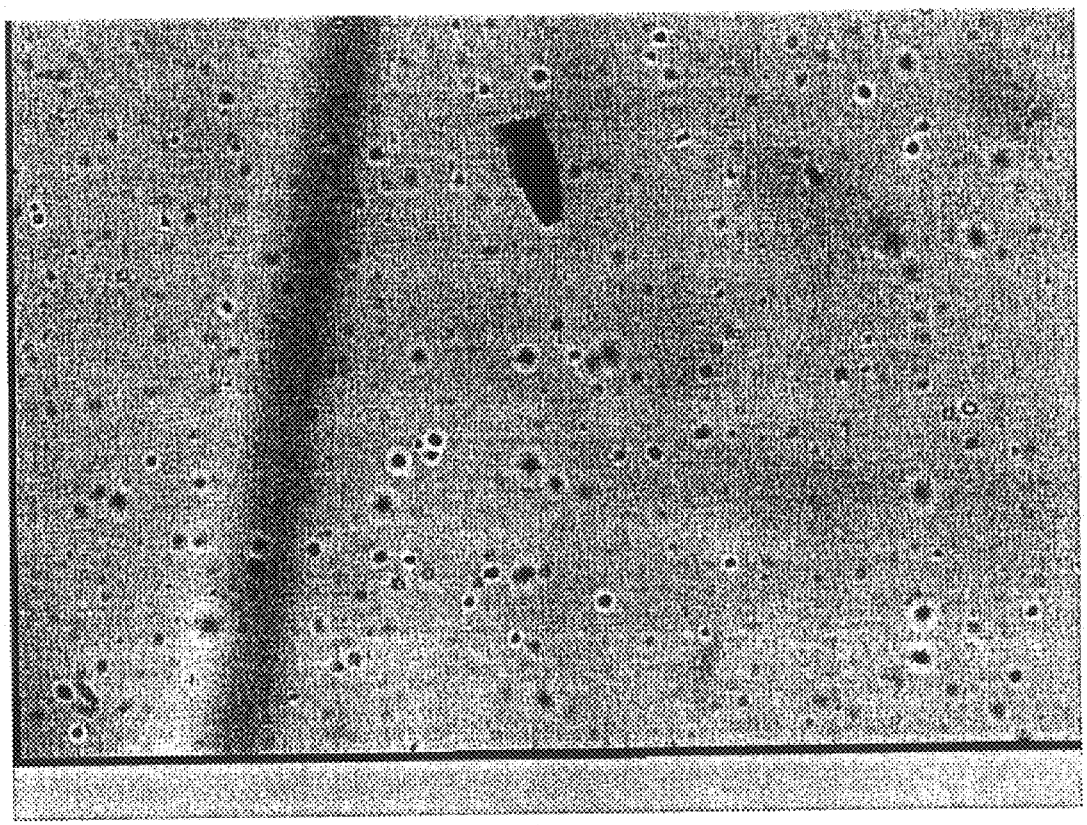
FIG. 4B is an optical photograph at 400× magnification of a trilayer film before biaxially stretching having a middle layer produced from the nanocomposite of the Comparative Example 3.
Figure 5A:
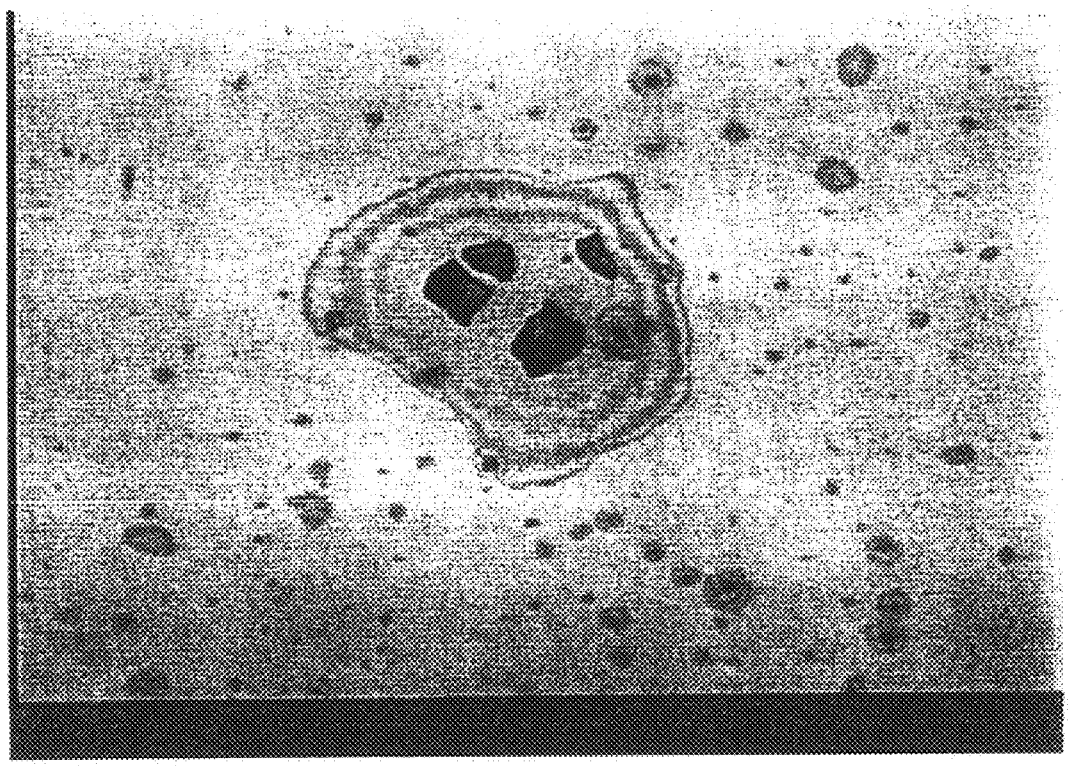
FIG. 5A is an optical photograph at 400× magnification (at the location of FIG. 4A) of the trilayer film after biaxially stretching.
Figure 5B:
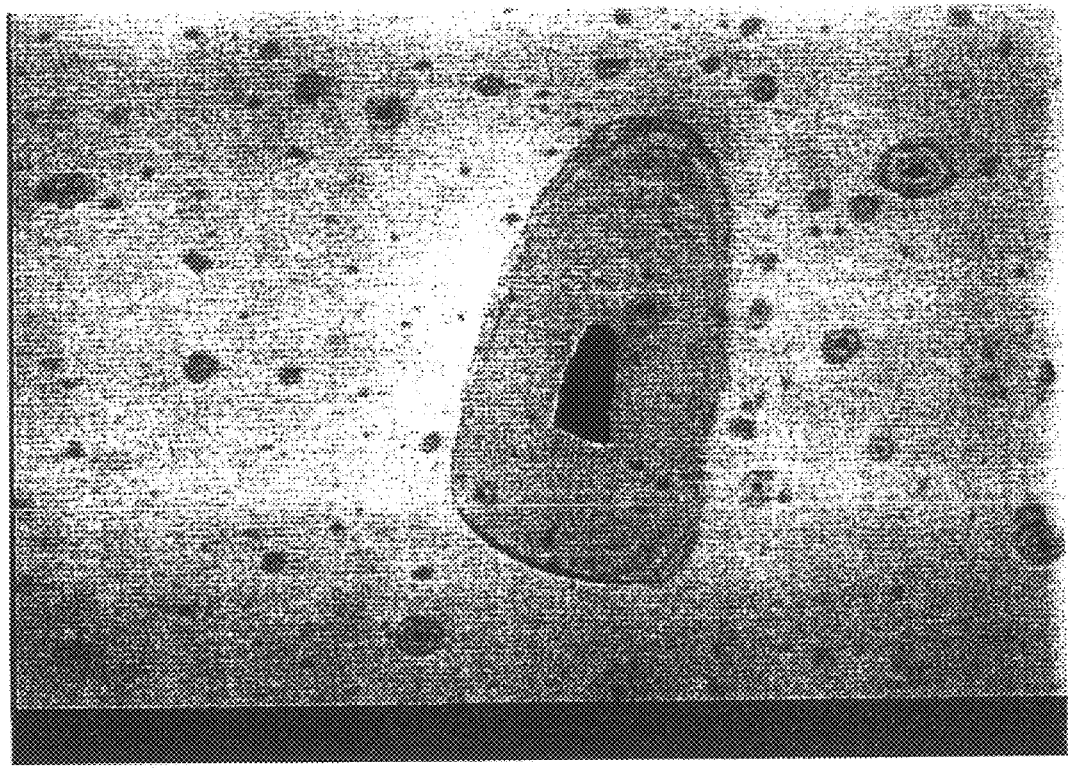
FIG. 5B is an optical photograph at 400× magnification (at the location of FIG. 4B) of the trilayer film after biaxially stretching.

The resulting nanocomposite material was also extruded into tri-layer films with Eastman's PET (of Eastman Chemical Company, Kingsport, Tenn.) as outside layers. The thickness of the nanocomposite is about 10 percent. Optical micrographs were taken on the tri-layer films up to 400× magnification. Dark particles were observed (FIG. 4A, and 4B). Then, the tri-layer film was biaxially stretched 4×4 at about 100° C. in a T. M. Long instrument. Micrographs were taken at the same location close to the dark particles. The dark particles either disintegrated, as shown in FIG. 5A, or remained unchanged, as shown in FIG. 5B. In both cases, there are significant hollow rings associated with the particles.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An intercalate comprising a layered clay material having less than about 2.0% by weight of quartz, based on the weight of the clay material, intercalated with an organic cation intercalant and a polyamide oligomer or polymer intercalant selected from the group consisting of poly (m-xylylene adipamide); a copolymer thereof; nylon 6; nylon 6,6; and a mixture thereof.

2. The intercalate of claim 1, wherein the layered clay material comprises montmorillonite, hectorite, mica, vermiculite, bentonite, nontronite, beidellite, volkonskoite, saponite, magadite, kenyaite, or a mixture thereof.

3. The intercalate of claim 1, wherein the clay material comprises sodium montmorillonite or sodium bentonite.

4. The intercalate of claim 1, wherein the layered clay material has less than about 1.0% by weight of quartz particles.

5. The intercalate of claim 1, wherein the organic cation intercalant is derived from an ammonium salt compound.

6. The intercalate of claim 1, wherein the polyamide oligomer or polymer intercalant comprises poly(m-xylylene adipamide) or a copolymer thereof, and the clay material comprises sodium montmorillonite or sodium bentonite.

7. The intercalate of claim 1 that functions to decrease the gas permeability and haze of the polyamide intercalant.

8. The intercalate of claim 7, wherein the polyamide comprises poly(m-xylylene adipamide) or a copolymer thereof, and the clay material comprises sodium montmorillonite or sodium bentonite.

9. The intercalate of claim 4, wherein the layered clay material has less than about 0.7% by weight quartz.

10. The intercalate of claim 9, wherein the layered clay material has less than about 0.5% by weight quartz.

11. A process for preparing an intercalate comprising the steps of:
  (i) intercalating a layered clay material with an organic cation, wherein the layered clay material has less than about 2.0% by weight of quartz, based on the weight of the layered clay material; and
  (ii) further intercalating the layered clay material with a melt of a polyamide oligomer or polymer intercalant selected from the group consisting of poly (m-xylylene adipamide); a copolymer thereof; nylon 6; nylon 6,6; and a mixture thereof.

12. The process of claim 11, wherein steps (i) and (ii) are conducted by a batch mixing or a melt compounding extrusion process.

13. The process of claim 11, wherein the layered clay material has less than about 0.7% by weight quartz.

14. The process of claim 13, wherein the layered clay material has less than about 0.5% by weight quartz.

15. The process of claim 13 wherein the polyamide oligomer or polymer intercalant comprises poly(m-xylylene adipamide), a copolymer thereof, or a mixture thereof.

16. The process of claim 11, wherein the polyamide oligomer or polymer intercalant comprises poly(m-xylylene adipamide), a copolymer thereof, or a mixture thereof.

17. The process of claim 13 that functions to decrease the gas permeability and haze of the polyamide intercalant.

18. The process of claim 14 that functions to decrease the gas permeability and haze of the polyamide intercalant.

* * * * *